May 15, 1962   S. E. WERNER   3,034,717
CASH REGISTER CONTROL APPARATUS
Filed Dec. 3, 1957   7 Sheets-Sheet 1
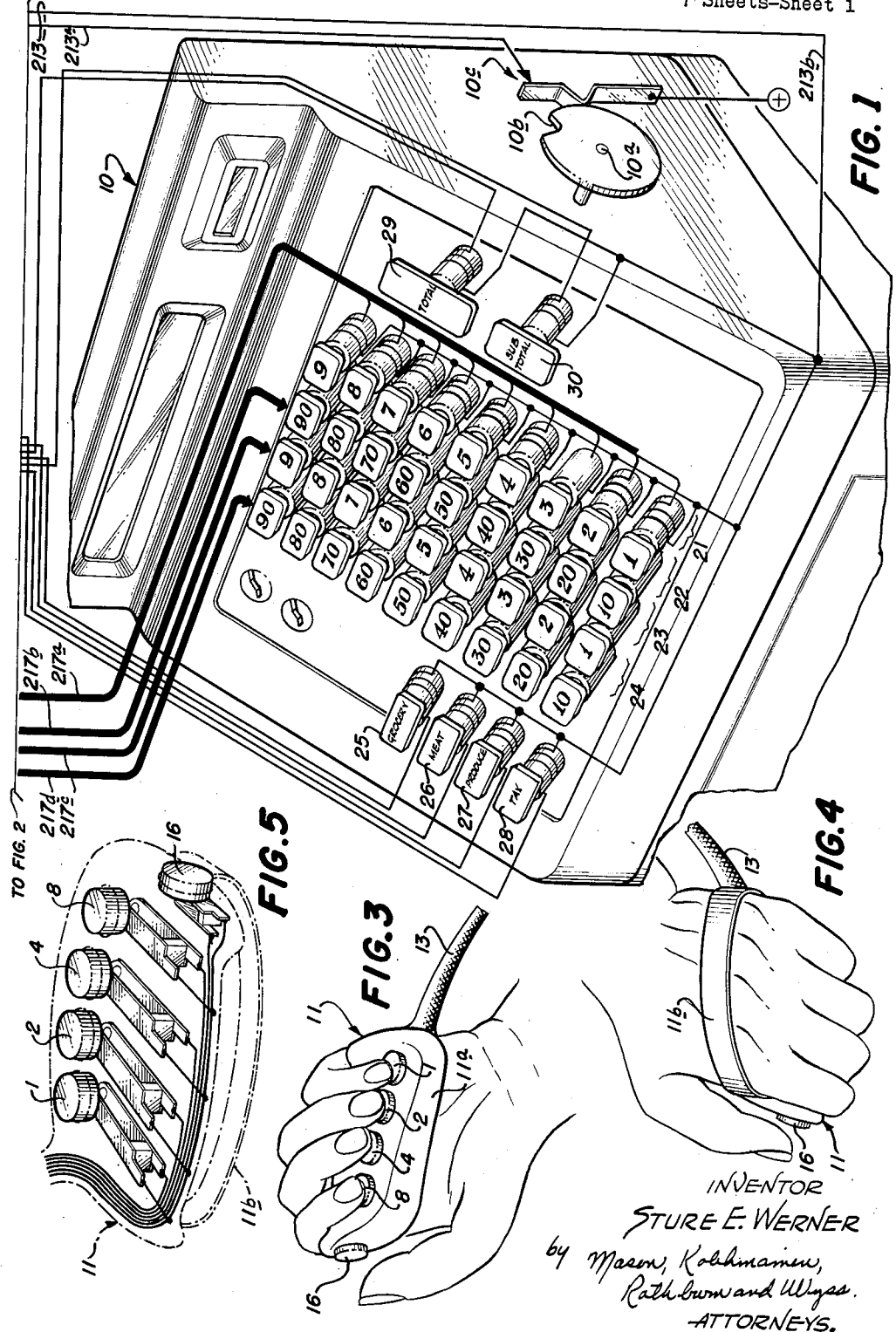
INVENTOR
STURE E. WERNER
by Mason, Kolehmainen,
Rathburn and Wyss.
ATTORNEYS.

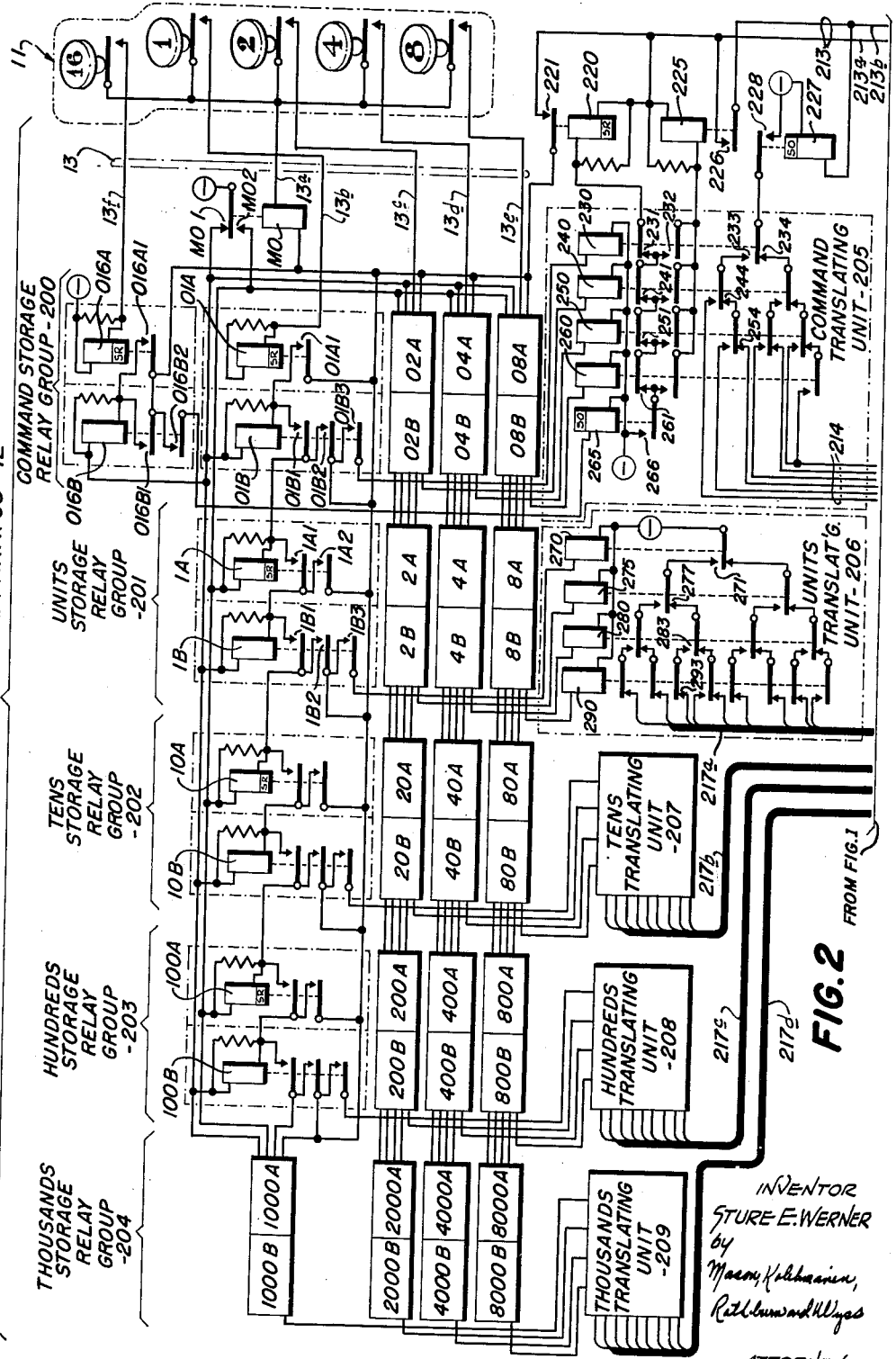

May 15, 1962

S. E. WERNER 3,034,717

CASH REGISTER CONTROL APPARATUS

Filed Dec. 3, 1957

7 Sheets-Sheet 3

FIG.6

INVENTOR
STURE E. WERNER
by
Mason, Kolehmainen, Rathburn and Wyss
ATTORNEYS

FIG. 7

INVENTOR
STURE E. WERNER
by Mason, Kolehmainen, Rathburn and Wyss
ATTORNEYS.

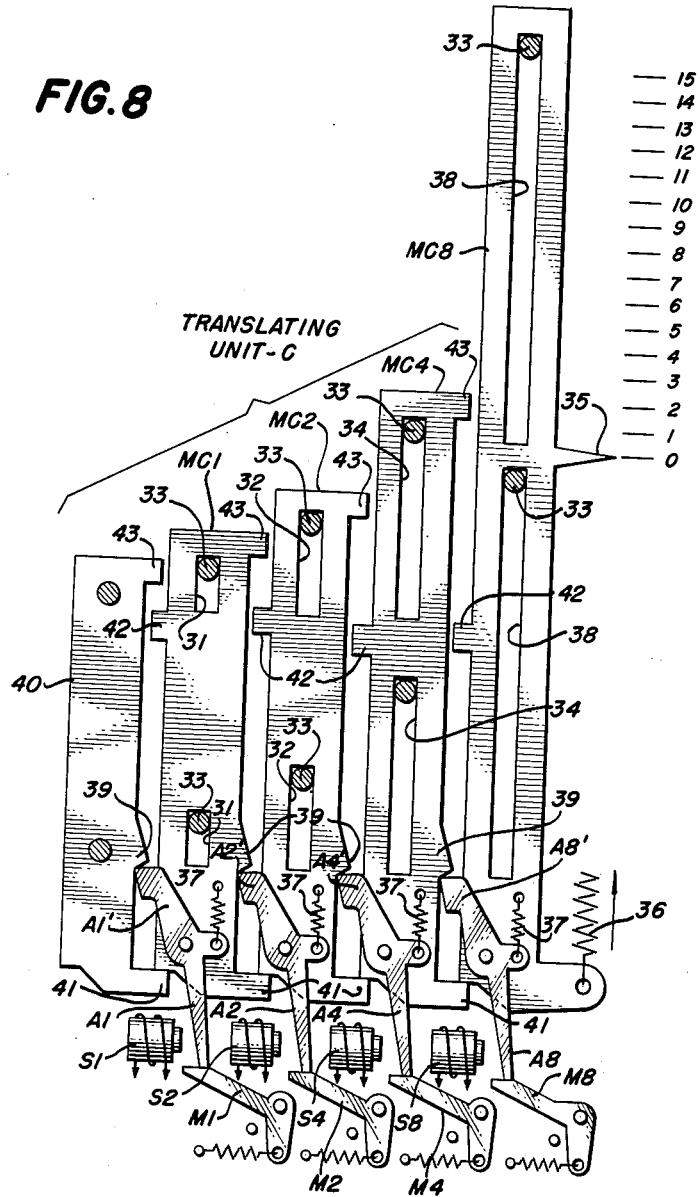

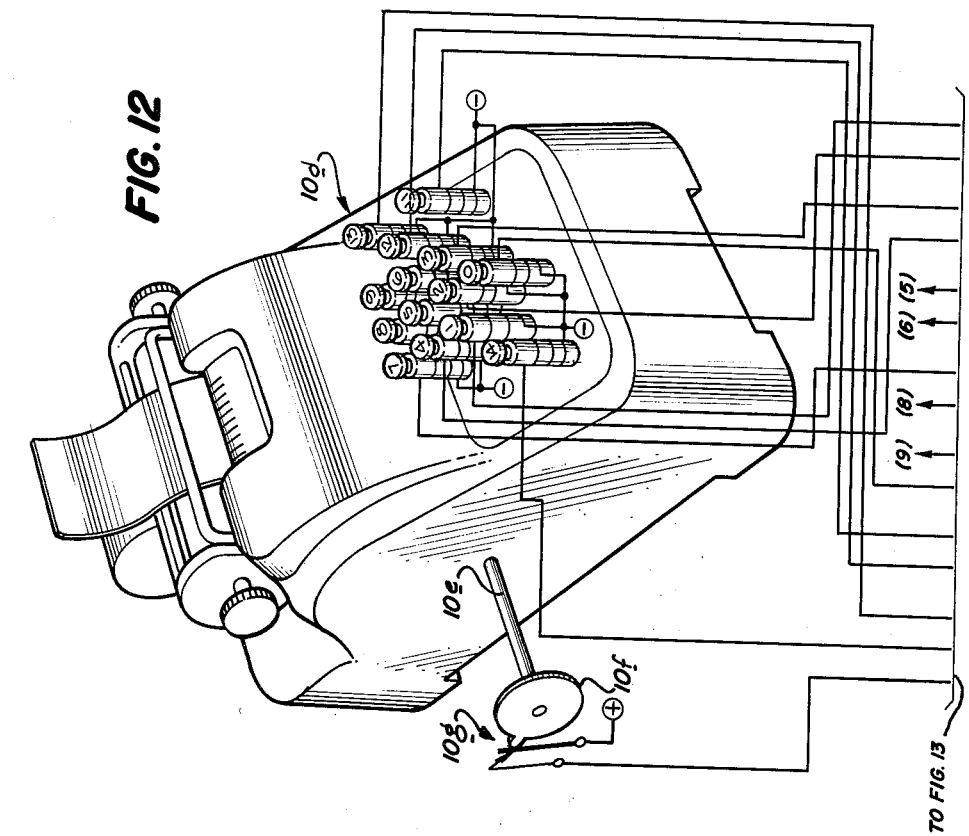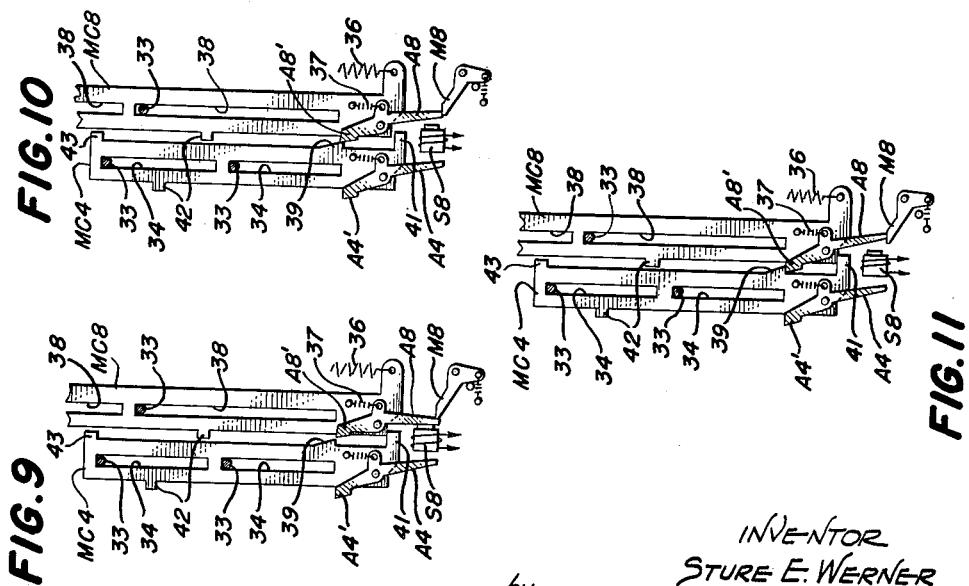

May 15, 1962

S. E. WERNER 3,034,717

CASH REGISTER CONTROL APPARATUS

Filed Dec. 3, 1957

7 Sheets-Sheet 7

FIG.13

United States Patent Office 3,034,717
Patented May 15, 1962

3,034,717
CASH REGISTER CONTROL APPARATUS
Sture Edward Werner, Stockholm, Sweden, assignor to Svenska Dataregister A.B., Stockholm, Sweden, a corporation of Sweden
Filed Dec. 3, 1957, Ser. No. 701,283
22 Claims. (Cl. 235—146)

The present invention relates to cash register control apparatus and more particularly to improved apparatus which may be operated by a clerk to effect full control of a cash register while permitting the clerk to move about and use both hands in the handling of merchandise being sold.

Conventional cash registers require that the clerk or attendant have one hand on the keyboard of the machine in order to operate the machine. This not only requires the use of one of the clerk's hands for the sole purpose of operating the register, but also requires that the operator stand within arm's length of the machine in order to operate the machine. In certain types of stores, such as the so-called supermarkets, the clerk or cash register attendant is required to register rapidly and in sequence the price and other data pertaining to a large number of low cost items, and is also required to handle the goods sold as it is moved across a counter top located adjacent the cash register stand. In such situations, restriction of the clerk or attendant to a position immediately adjacent the cash register, occupation of the clerk's eyes with the keyboard of the machine, and occupation of one of the clerk's hands solely with operation of the register keyboard, materially reduces the speed and efficiency with which the goods sold to each customer can be handled by the clerk and entered in the register to obtain sales totals from the register.

It is an object of the present invention, therefore, to provide in combination with a cash register, improved apparatus which will permit a clerk or operator accurately to control the operation of the register while moving around and handling goods with both hands and without watching the keyboard of the register.

It is another object of the invention to provide improved apparatus of the character described, which is detached from the register and which embodies a portable control unit that can easily be carried in one hand by the cash register operator and can easily be manipulated by the fingers of the hand by which it is carried.

According to a further object of the invention, the portable control unit is so constructed that it does not substantially interfere with use of the operator's hand by which it is carried in the handling of goods being sold.

In accordance with still another object of the invention, the portable control unit is equipped with control keys which are substantially lesser in number than the price entering and command control elements of the cash register, and are adapted to be manipulated through use of the touch method to effect selective operation of the control elements of the register.

According to a still further object of the invention, translating facilities are interposed between the portable control unit and the price entering and command control elements of the cash register, which are so arranged that a selected one of the register control elements is only actuated in response to operation and release of the particular control key or combination of keys which corresponds to the selected register control element.

The invention, both as to its organization and method of operation, together with further objects and advantages thereof, will best be understood by reference to the following specification taken in connection with the accompanying drawings, in which:

FIGS. 1 and 2, when placed one below the other in the order named, illustrate one embodiment of the present invention;

FIGS. 3 and 4 are different perspective views of the portable control unit forming a part of the apparatus illustrated in FIG. 2;

FIG. 5 schematically illustrates the circuit arrangement of the portable control unit shown in FIGS. 3 and 4;

FIGS. 6 and 7, when placed one above the other in the order named, illustrate a second embodiment of the present improved apparatus;

FIG. 8 diagrammatically illustrates the mechanical arrangement of one of the mechanical translating units embodied in the apparatus shown in FIG. 7;

FIGS. 9, 10 and 11 are fragmentary views of the mechanism shown in FIG. 8, illustrating the details of certain components embodied in the mechanism; and FIGS. 12 and 13, when placed one above the other in the order named, illustrate a third embodiment of the present improved apparatus.

Referring now to the drawings and more particularly to FIGS. 1 and 2 thereof, the present invention is there illustrated in its embodiment in apparatus for controlling a cash register 10 of the type conventionally employed in supermarkets or grocery stores in the computation of charges for sales of consumable commodities such as groceries, meat and produce. The cash register 10 may be of any desired commercial type embodying the requisite array of price entry and command or "kind of operation" keys. As shown, the register 10 comprises four different order sets of price entry keys 21, 22, 23 and 24 for entering the units, tens, hundreds and thousand digits of price designations in the register. More specifically, the nine keys in the set 21 are cent keys, the nine keys in the set 22 are ten cent keys, the nine keys in the set 23 are dollar keys and the nine keys in the set 24 are ten dollar keys. In addition, the register 10 comprises six command keys, including three merchandise classification keys 25, 26 and 27, a tax key 28, a total key 29 and a subtotal key 30, the purpose and function of which are well known in the art. Each of the identified keys is individually equipped with an electromagnet which when energized, has the effect of operating the key in the same manner as though the key were manually depressed. In accordance with well understood practice, the cash register 10 is also equipped with a so-called motor bar or main shaft which is adapted to be motor-driven through one complete revolution during each operating cycle of the machine, and more particularly in response to operation of any one of the command keys 25 to 30, inclusive. For convenience of illustration, this motor-driven shaft is shown as having an extension 10a which projects through the housing of the cash register 10 and carries a switch actuating cam 10b for actuating a cam switch 10c during each operating cycle of the register.

Referring now more particularly to FIG. 2 of the drawings, the equipment there illustrated is provided to permit single handed remote control of the cash register 10 to produce any desired operation of the register, while also permitting the machine operator to move about at points away from the register and to use both hands in the handling of merchandise being sold to a customer. In general, this equipment comprises a portable control unit 11 which is detached from the cash register 10 and is adapted to be carried in one hand by an operator, and translating and storing apparatus 12 which is adapted to be selectively controlled over a six conductor cable 13 by the control unit 11 to effect selective energization of the electromagnets respectively associated with the price entry and command keys of the register. More specifically, and as best shown in FIGS. 3, 4 and 5 of the drawings, the portable control unit 11 comprises four finger keys 1, 2, 4 and 8, which are adapted to be actuated by the little finger, the middle finger, the ring finger and the fore finger of one hand, respectively, and a thumb key 16 which is adapted to be actuated by the thumb of the operator's hand. These five keys are of the self-restoring type and each has associated therewith a pair of make contacts which are closed in response to depression of the key and opened in response to release of the key. The five keys are supported by an insulating housing 11a which is shaped to conform to the palm of the operator's hand and has rigidly attached thereto an elastic strap 11b for securing the unit 11 to the operator's hand. For convenience of manipulation, the operating buttons of the four finger keys 1, 2, 4 and 8 are arranged in a row extending longitudinally of the housing 11a and across the palm of the operator's hand, whereas the operating button of the thumb key 16 is located at the end of the housing 11a adjacent the thumb of the operator's hand. It will be understood that the operating buttons for the five keys extend through appropriate openings in the housing 11a and that the flexible cable 13 which embodies the six cable conductors 13a, 13b, 13c, 13d, 13e and 13f shown in FIGS. 2 and 5 is connected to the portable control unit 11 by suitably anchoring one end thereof within the housing 11a.

Generally considered, the translating and storing apparatus 12 comprises five sets of storage relay groups 200, 201, 202, 203 and 204, five relay type translating units 205, 206, 207, 208 and 209, four control relays M0, 220, 225 and 227. All of the identified components of the translating and storing apparatus 12 are remotely located with respect to the portable control unit 11 and are only controlled by this unit over the signal channels afforded by the six conductors of the cable 13. For convenience and in order to shorten the length of the cable comprising the conductor groups 213, 214, 217a, 217b, 217c and 217d, which interconnects the apparatus 12 with the cam switch 10c and the operating magnets for the keys of the cash register 10, all components of the apparatus 12 are preferably located rather closely adjacent the cash register 10.

As will be understood from the following explanation, the five storage relay groups 200–204 are provided to store in binary code form price and command information set up therein through selective manipulation of the five keys embodied in the control unit 11, and the five translating units 205–209 are provided to translate the information stored in the respective associated storage relay groups from binary form to decimal form, thereby to provide for the desired selective control of the command and price entry keys embodied in the cash register 10. In this connection, it will be apparent that the command translating unit 205, comprising the five relays 230, 240, 250, 260 and 265, is individually associated with the command storage relay group 200 comprising the relays 016A, 01A, 02A, 04A, 08A, 016B, 01B, 02B, 04B and 08B, and in turn only controls the command keys 25–30, inclusive, of the cash register 10 over the conductors of the conductor group 214. Similarly, the four relays 270, 275, 280 and 290 making up the units translating unit 206 are arranged for selective energization only under the control of the relays 1A, 2A, 4A, 8A, 1B, 2B, 4B and 8B making up the units storage relay group 201, and in turn only control on a selective basis the magnets associated with the nine cent keys making up the key row 21 in the register 10 over the conductors of the conductor group 217a. In similar manner, the tens translating unit 207, hundreds translating unit 208 and thousands translating unit 209 are individually and respectively controlled by the tens storage relay group 202, the hundreds storage relay group 203 and the thousands storage relay group 204, and in turn individually and respectively control actuation of the keys in the key rows 22, 23 and 24 of the register 10 over the conductors of the conductor groups 217b, 217c and 217d, respectively.

As explained more fully below, in effecting a machine operating cycle of the register 10, from one to five code digit signals each representative of a code number having a numerical value of from 1 to 31 are generated through selective operation of the keys in the control unit 11 in different combinations. These code digit signals are transmitted over the signal channels afforded by the conductors of the cable 13 and are initially entered in the command storage relay group 200. In accordance with one highly important feature of the present invention, registration of a code number in the apparatus 12 and more particularly in the command relay group 200 can only occur in response to operation and release of a particular one or combination of the keys embodied in the control unit 11. By virtue of this feature it is possible for the operator to correct finger manipulating errors by simply holding down one or more erroneously actuated keys of the control unit 11, operating the correct key or keys representative of the desired code digits and then releasing the erroneously operated key or keys, such release being ineffective so long as other keys remain operated in the control unit.

Code numbers having values of 15 or less can be set up in the command storage relay group 200 solely through manipulation of the finger keys 1, 2, 4 and 8, whereas any code number having a value in excess of 15 can only be entered in the command storage relay group 200 through manipulation of the thumb key 16 in combination with one or more of the finger keys. The thumb key 16, when operated alone, is used for correction purposes.

Any code number having a value between 10 and 15 which is registered in the command storage relay group 200 through a manipulation of the finger keys 1, 2, 4 and 8 is effectively stored therein as zero. Thus, when these code numbers are successively transferred first from the command storage relay group 200 to the units storage relay group 201 and then to one of the relay groups 202, 203 and 204 of successively higher order, the code numbers "10" to "15," inclusive, do not cause energization of any of the key magnets in the rows 21, 22, 23 and 24.

In accordance with another important feature of the invention, any code numbers having a value in excess of 16, i.e., any code number formed by manipulation of the thumb key 16 in combination with one or more of the finger keys 1, 2, 4 and 8, have the effect of initiating an operating cycle of the cash register 10, whereas any code number having a numerical value of 16 or less cannot initiate an operating cycle of the register. By virtue of this arrangement the command storage relay group 200 may be used for the dual purpose of transferring price data digits entered therein to the units storage relay group and, in combination with the command translating unit 205, of controlling the command keys of the register 10.

More specifically and as will appear from a study of the contact wiring arrangement employed in conjunction with the four relays of the units translating unit 206, the binary to decimal translation is accomplished in the units, tens, hundreds and thousands decades in the manner indicated by the following table:

| Numerical Price Digit | Code Number | Keys Operated In Portable Control Unit 11 | Relays Operated In Units Storage Relay Group 201 | Relays Operated In Units Translating Unit 206 |
| --- | --- | --- | --- | --- |
| 1 | 1 | 1 | 1B | 270. |
| 2 | 2 | 2 | 2B | 275. |
| 3 | 3 | 1 and 2 | 1B and 2B | 270 and 275. |
| 4 | 4 | 4 | 4B | 280. |
| 5 | 5 | 1 and 4 | 1B and 4B | 270 and 280. |
| 6 | 6 | 2 and 4 | 2B and 4B | 275 and 280. |
| 7 | 7 | 1, 2 and 4 | 1B, 2B and 4B | 270, 275 and 280. |
| 8 | 8 | 8 | 8B | 290. |
| 9 | 9 | 1 and 8 | 1B and 8B | 270 and 290. |
| 0 | 10 | 2 and 8 | 2B and 8B | 275 and 290. |
| 0 | 11 | 1, 2 and 8 | 1B, 2B and 8B | 270, 275 and 290. |
| 0 | 12 | 4 and 8 | 4B and 8B | 280 and 290. |
| 0 | 13 | 1, 4 and 8 | 1B, 4B and 8B | 270, 280 and 290. |
| 0 | 14 | 2, 4 and 8 | 2B, 4B and 8B | 275, 280 and 290. |
| 0 | 15 | 1, 2, 4 and 8 | 1B, 2B, 4B and 8B | 270, 275, 280 and 290. |

The unit 206 translates the code numbers 10 to 15, inclusive, as zero since no conductive paths are prepared by the decoding contact "tree" controlled by the translating relays 270, 275, 280 and 290. The wiring of the relay contacts in each of the tens, hundreds, and thousands translating units 207, 208 and 209 is identical with that employed in the units translating unit 206.

In the event that the cash register control is to be used in sterling areas, the storage groups 200—204 can be arranged to store the code numbers 10 and 11 to represent ten and eleven pence and the code numbers 12–15 will then represent zero. In this application, the proper related translating units 206—209 can provide conductive paths in accordance with the code numbers 10 and 11 representing ten and eleven pence and will not provide conductive paths for the code numbers 12–15 representing zero.

In the command section of the apparatus 12, five relay stages are used in both the storage relay group 200 and the translating unit 205 and the wiring of the relay contacts 205, in terms of the functions to be performed by the cash register 10, is given by the following table:

| Command Key Of Register 10 To Be Operated | Numerical Command Digit | Keys Operated In Portable Control Unit 11 | Relays Operated In Command Storage Relay Group 200 | Relays Operated In Command Translating Unit 205 |
| --- | --- | --- | --- | --- |
| Grocery | 17 | 16 and 1 | 016B and 01B | 265 and 230. |
| Meat | 18 | 16 and 2 | 016B and 02B | 265 and 240. |
| Produce | 19 | 16, 1 and 2 | 016B, 01B and 02B | 265, 230 and 240. |
| Tax | 20 | 16 and 4 | 016B and 04B | 265 and 250. |
| Subtotal | 21 | 16, 1 and 4 | 016B, 01B and 04B | 265, 230 and 250. |
| Total | 22 | 16, 2 and 4 | 016B, 02B and 04B | 265, 240 and 250. |

As will be explained more fully below, the code digit 16, when transmitted to the translating and storing apparatus 12 through operation of the thumb key 16 in the control unit 11, is reserved to effect operation of the correction relay 220 which, when operated, clears the apparatus 12 of any data previously entered therein before this data is transferred to the cash register 10.

Referring now more particularly to the operation of the apparatus illustrated in FIGS. 1 and 2 of the drawings, it may be assumed that a customer buys groceries in the amount of $16.05, meat having a purchase price of $7.92 and produce having a sales price of $4.89, and that the tax on each of these items is 3%. In setting up the information representative of this particular sales transaction in the cash register 10, the operator first actuates the thumb key 16 of the control unit 11 to clear the translating and storing apparatus 12 of any information previously registered therein. In response to operation of the thumb key 16, a circuit is completed for energizing the relay 016A in the command storage relay group 200 in series with the relay M0, this circuit extending from the positive terminal of the current source by way of the switch 10c, the conductor 213a, the contacts 221, the winding of the relay M0, the cable conductor 13a, the contacts of the key 16, the cable conductor 13f and the winding of relay 016A to the negative terminal of the current source. In operating, the relay M0 opens its contacts M01 to open a point in the common portion of the operating circuits for the B relays in the five storage relay groups. At its contacts M02, the relay M0 prepares the operating circuits for the A relays in the five storage relay groups. The slow-to-release relay 016A also operates when energized in the above-traced circuit and closes its contacts 016A1 to prepare the operating circuit for its associated B relay 016B. No further relay operations occur in the apparatus 12 until the thumb key 16 of the control unit 11 is released.

Upon release of the key 16, the relays M0 and 016A are deenergized and restore. However, since the relay M0 is fast acting and the relay 016A is slow-to-release, the latter relay retains its operated position until after the relay M0 has fully released. In releasing, the relay M0 closes its contacts M01 to complete the prepared operating circuit for the relay 016B, this circuit extending from the positive terminal of the current source by way of the switch 10c, the conductor 213a, the contacts 221, the contacts 016A1, the winding of the relay 016B and the contacts M01 to the negative terminal of the current source. In operating, the relay 016B locks up through its contacts 016B1, and closes its contacts 016B2 to complete the operating circuit for the relay 265 in the command translating unit 205, this circuit extending from the positive terminal of the current source as connected to the conductor 213a, by way of the contacts 221 and 016B2, and the winding of the relay 265 to the negative terminal of the current source. Shortly following operation of the relay 016B, the relay 016A restores, its operating circuit having been interrupted at the contacts of the key 16 upon release of this key by the operator.

The relay 265, in operating, closes its contacts 266 to complete a circuit through the contacts 261, 251, 241, and 231 for energizing the correction relay 220. The relay 220, upon operating, opens its contacts 221 to interrupt a common point in the operating and locking circuits for all of the relays embodied in the translating and storing apparatus 12, thereby to effect the deenergization and release of any relays which are operated in this apparatus. Incident to operation of the slow-to-release correction relay 220, the relays 016B and 265 are deenergized and restore. The latter relay, in releasing, opens its contacts 266 to deenergize the relay 220. Upon restoring, the relay 220 recloses its contacts 221 to reprepare the operating and locking circuits for the relays embodied in the apparatus 12. Thus, this apparatus is cleared of data which may have previously been entered therein and is now in readiness to accept the entry of data pertaining to the particular transaction at hand.

To set up the grocery purchase designation of $16.05 in the apparatus 12, the operator in attendance at the register 10 first depresses and then releases the key 1 of the control unit 11 to enter the digit 1 in the command relay group 200. When the key 1 of the control unit 11 is depressed, a circuit including the cable conductors 13a and 13b is completed for energizing the relay 01A in series with the relay M0, this circuit also including the contacts 221, the conductor 213a and the switch 10c. When energized in this circuit, the relay M0 operates to perform the functions described above. The slow-to-release relay 01A also operates when energized in this circuit and closes its contacts 01A1 to prepare the operating circuit for its associated B relay 01B. When the key 1 of the control unit 11 is subsequently released, the relay M0 restores and closes its contacts M01 to complete the prepared operating circuit, including the contacts 01A1 and 221, for the relay 01B. In operating, the relay 01B closes its contacts 01B1 to prepare the operating circuit for the relay 1A in the units storage relay group 201. At its contacts 01B1 and 01B2, the relay 01B completes an obvious locking circuit for itself, so that it is held operated after the slow-to-release relay 01A releases shortly following release of the relay M0 in response to release of the key 1 in the control unit 11. At its contacts 01B3, the relay 01B completes a circuit including the contacts 221 and the energized conductor 213a for energizing the relay 230 in the command translating unit 205. In operating, the relay 230 opens its contacts 231 to interrupt a point in the operating circuit for the correction relay 220, closes its contacts 232 to prepare the operating circuit for the start relay 225, opens its contacts 234 to interrupt a common point in the operating circuits for the electromagnets respectively associated with the total, meat and tax command keys of the register 10, and closes its contacts 233 to prepare a common point in the operating circuits for the electromagnets associated with the produce, subtotal and grocery keys of the register. It should be pointed out here that since the digit 1 is now entered in the command storage relay group 200, it is without effect at this time, since this digit will ultimately be transferred to the thousands storage and translating section of the apparatus 12 in the manner pointed out below.

In order to enter the hundreds digit 6 of the price item $16.05 in the command section of the apparatus 12 and concurrently to transfer the thousands digit 1 from the command section of the apparatus to the units section of the apparatus, the keys 2 and 4 of the control unit 11 are depressed and then simultaneously released. In response to operation of the keys 2 and 4 in the control unit 11, the relays 02A and 04A in the command storage relay group 200 are energized in series with the relay M0 over circuits which include the conductors 13c, 13d and 13a of the cable 13. At its contacts M02, the relay M0, in operating, completes the prepared operating circuit for the relay 1A in the units storage relay group 201, this circuit extending from the positive terminal of the current source as connected to the conductor 213a, by way of the contacts 221 and 01B2, the winding of the relay 1A and the contacts M02 to the negative terminal of the current source. The relay 1A, in operating, locks up through its contacts 1A1 and 1A2, and at its contact 1A2, prepares the operating circuit for the relay 1B. As will be understood from the foregoing explanation, the relays 02A and 04A, in operating in the command storage relay group 200, respectively prepare the operating circuits for the relays 02B and 04B. In operating, to open its contacts M01, the relay M0 also interrupts the previously described locking circuit for the storage relay 01B, thereby to effect the sequential release of the latter relay and the relay 230 in the translating unit 205. It should be noted, however, that due to the resistive shunt across the winding of the relay 01B, this relay is slightly slow-to-release, so that the relay 1A has ample time to operate and lock up before its operating circuit is broken at the contacts 01B2 when the relay 01B releases. To summarize, it will be understood that in response to the described operation of the keys 2 and 4 in the portable control unit 11, the relays M0, 02A and 04A are operated, the relay 1A is operated and locked up and the relays 01B and 230 are deenergized. At this point, it should be noted that in the event the key 8, for example, of the control unit 11 is inadvertently operated along with the keys 2 and 4 to effect energization and operation of the relay 08A along with the relays 02A and 04A, the error in key manipulation may be corrected by simply releasing the key 8 to effect the deenergization of the relay 08A before the keys 2 and 4 are released. Similarly if the keys 1 and 2 are inadvertently operated instead of the keys 2 and 4, correction may be made by simply holding down the key 2, releasing the key 1 to effect the deenergization of the relay 01A and depressing the key 4 to effect energization of the relay 04A. Thus the importance of only effecting a digit storage operation in response to the release of all of the operated keys, one or more in number, in the portable control unit 11 becomes apparent.

When the keys 2 and 4 of the control unit 11 are released, the relays M0, 02A and 04A are deenergized and restore. In releasing, the relay M0 closes its contacts M01 to complete the prepared operating circuits for the relays 1B, 02B and 04B, it being noted that since the A relays are all slow-to-release, the identified B relays have ample time to operate and lock up before their operating circuits are interrupted at the make contacts of their respective associated A relays. The relays 02B and 04B in operating, complete obvious operating circuits for the relays 240 and 250 in command translating unit 205, complete locking circuits for themselves, and prepare operating circuits for the relays 2A and 4A in the units storage relay group 201. The relay 1B upon operating in the units storage relay group 201, closes its contacts 1B1 and 1B2 to complete an obvious locking circuit for itself, and its contacts 1B2 prepares the operating circuit for the relay 10A in the tens storage relay group 202. At its contacts 1B3, the relay 1B completes an obvious operating circuit for the relay 270 in the units translating unit 206. Operation of the relays 240, 250 and 270 in the translating units 205 and 206 is without effect at this time.

From the above explanation, it will be noted that following release of the keys 2 and 4 in the portable control unit 11 to effect operation of the relays 1B, 02B and 04B in the manner just explained, the digit 1 is entered in the units storage relay group 201 and the digit 6 is entered in the command storage relay group 200. In order to enter the digit 0 of the grocery price designation in the apparatus 12, the keys 2 and 8 are depressed and simultaneously released in the control unit 11. In response to operation of these two keys, the relays 02A and 08A are energized in series with the relay M0 over the cable conductors 13a, 13c and 13e. In response to operation of the relay M0, the relay 10A is energized and locked up in the tens storage relay group 202. Upon operating, the relay also prepares the operating circuit for the associated B relay 10B. Following operation of the relay 10A the relays 1B and 270 are sequentially released in the units section of the apparatus 12. In the units storage relay group 201, the relays 2A and 4A are energized through the contacts M02 in response to operation of the relay M0. Following operation of these relays and the establishment of locking circuits therefor through the M02 contacts of the relay M0, the relays 02B and 04B release in the command storage relay group 200 to effect the deenergization and release of the relays 240 and 250 in the translating unit 205. Thus after the relay operations resulting from depression of the keys 2 and 8 in the control unit 11 are completed, the relay 10A is operated and locked up in the tens storage relay group 202, the relays 2A and 4A are energized and locked up in the units storage relay group 201 and the relays 02A and 08A are energized and locked up in the command storage relay group 200.

Upon release of the keys 2 and 8 in the control unit 11, the relay 10B in the tens storage relay group 202, the relays 2B and 4B in the units storage relay group 201 and the relays 02B and 08B in the command storage relay group 200 are all energized and locked up over operating and locking circuits which will be clearly apparent from the above explanation. Following operation of the enumerated B relays, the relay 10A in the tens storage relay group 202, the relays 2A and 4A in the units storage relay group 201 and the relays 02A and 08A in the command storage relay group 200 are all deenergized and restore. With the relays 02B and 08B operated in the command storage relay group 200, the relays 260 and 240 are obviously energized in the command translating unit 205. Similarly, with the relays 2B and 4B energized in the units storage relay group 201, the relays 275 and 280 are operated in the units translating unit 206. Thus it will be understood that at this point in the entry of the price designation in the apparatus 12, the digit 1 is stored in the tens section of the apparatus, the digit 6 is stored in the units section of the apparatus and the digit 0 is stored in the command section of the apparatus.

In order to enter the digit 5 in the apparatus 12, the keys 1 and 4 of the portable control unit 11 are operated to effect energization of the relays 01A and 04A in the command storage relay group 200 in series with the relay M0. The relay M0, in operating, closes its contacts M02 to complete the prepared operating circuits for the relay 100A in the hundreds storage relay group 203, the relays 20A and 40A in the tens storage relay group 202, and the relays 2A and 8A in the units storage relay group 201. Following operation of these relays and establishment of the prepared holding circuits therefor through the M02 contacts of the relay M0, the relays 10B, 2B, 4B, 02B and 08B are deenergized and restore to effect the release of the operated relays respectively controlled thereby in the translating units 207, 206 and 205. Th relays 100A, 20A, 40A, 2A, 8A, 01A and 04A, in operating, also prepare operating circuits for their respective associated B relays 100B, 20B, 40B, 2B, 8B, 01B and 04B.

When the keys 1 and 4 of the control unit 11 are released, the relays M0, 01A and 04A are deenergized and restore. In releasing, the relay M0 closes its contacts M01 to complete the prepared operating circuits for the relays 100B, 20B, 40B, 2B, 8B, 01B and 04B. The enumerated B relays immediately operate and close locking circuits for themselves in a manner which will be fully apparent from the preceding explanation. Shortly following operation of the identified B relays, the A relays 100A, 20A, 40A, 2A, 8A, 01A and 04A, respectively associated therewith are deenergized and restore. As will be understood from the above explanation, operation of the relays 01B and 04B in the command storage relay group 200 results in energization and operation of the relays 230 and 250 in the command translating unit 205, and operation of the relays 2B and 8B in the units storage relay group 201 results in energization and operation of the relays 275 and 290 in the units translating unit 206. In this regard, it will be noted from examination of the contact wiring employed in the units translating unit 206, which wiring is also employed in the translating units 207, 208 and 209 of higher order, that with the relays 275 and 290 operated, the negative terminal of the current source is disconnected from all nine conductors of the cable 217a, so that no circuit is prepared through the contacts of the relays in the translating unit 206 for energizing the electromagnets associated with any of the keys in the register 10. In a manner which will be entirely apparent from the preceding explanation, with the relays 20B and 40B operated in the tens storage relay group 202, those relays of the tens translating unit 207 which, when operated in combination designate the numerical digit 6, are energized and operate. Similarly, with the relay 100B energized in the hundreds storage relay group 203, that relay of the hundreds translating unit 208 which corresponds to the relay 270 of the units translating unit 206 is operated in the hundreds translating unit 208. At this point in the operation of the apparatus 12, the digit 1 is entered in the hundreds storage relay group 203, the digit 6 is entered in the tens storage relay group 202, the digit 0 is entered in the units storage relay group 201 and the digit 5 is entered in the command storage relay group 200. Thus all digits of the price designation are entered in the translating and storing apparatus 12.

In order to effect transfer of the digits of this price designation into the decades of correct order and to instruct the cash register 10 that the price item of $16.05 is a grocery item, as well as to initiate operation of the register 10 to enter the price designation in both the grocery totalizer and the listing totalizer of the register, the keys 16 and 1, representative of the code number 17, are operated in the portable control unit 11 and then released. In response to operation of the keys 16 and 1, the relays 016A and 01A are energized in series with the relay M0. In operating, the relay M0 completes the prepared operating circuits with the A relays of the storage relay groups 204, 203, 202 and 201 which respectively correspond to the operated B relays in the storage relay groups of next lower order. Specifically, the relay 1000A of the group 204, the relays 200A and 400A of the group 203, the relays 20A and 80A of the group 202, and the relays 1A and 4A of the group 201 are energized and operate in response to operation of the relay M0. In operating, these relays lock up and prepare operating circuits for their respective associated B relays. Following operation of the identified A relays, the relays 100B, 20B, 40B, 2B, 8B, 01B and 04B are deenergized and restore to effect the release of the operated relays respectively controlled thereby in the translating units 208, 207, 206 and 205.

Upon release of the keys 16 and 1 in the control unit 11, the relay M0 is deenergized and restores to effect energization and operation of the B relays 1000B, 200B and 400B, 20B and 80B, 1B and 4B, and 016B and 01B. These B relays in operating, lock up and energize the translating unit control relays respectively controlled thereby, following which the A relays respectively associated therewith are deenergized and restore. Thus it will be understood that the relays 265 and 230 of the command translating unit 205 are energized and operate in response to operation of the relays 016B and 01B in the command storage relay group 200; the relays 270 and 280 are energized and operate in response to operation of the relays 1B and 4B in the units storage relay group 201; the relays of the tens translating unit 207 whose combined operation designates the numerical digit 0 and which are controlled by the relays 20B and 80B, are operated in the tens translating unit 207; and so on for the hundreds translating unit 208 and the thousands translating unit 209 wherein the translating relays respectively representing the digits 6 and 1 are energized under the control of the storage relay group B relays 200B, 400B and 1000B.

Following and incident to the relay operations just described, the cash register 10 is controlled to receive and store the information set up in the translating and storing apparatus 12. More specifically, the relays 230 and 265, upon operating in the command translating unit 205, complete the prepared operating circuit for the start relay 225, this circuit extending from the positive terminal of the current source as connected to the conductor 213a, through the winding of the relay 225 and by way of the contacts 232, 241, 251, 261 and 266 to the negative terminal of the current source. It will be noted that with the relay 230 operated in the command translating unit 205, the operating circuit for the correction relay 220 is held open at the contacts 231 of the identified translating unit relay. In this regard, it is noted that the relay 265 is slightly slow-to-operate, so that upon concurrent energization of this relay in combination with one or more of the other relays in the command translating unit 205, it will not operate until after the other relay or relays of this unit have operated to interrupt the operating circuit for the correction relay 220.

The start relay 225, upon operating, closes its contact 226 to complete the circuits for energizing the magnets associated with those of the keys in the cash register 10 which have been selected through operation of the translating apparatus 12 under the control of the control unit 11 in the manner explained above. Thus with the digit 5 entered in the units section of the apparatus 12, a circuit is completed for energizing the electromagnet associated with the key 5 in the key row 21 in response to operation of the start relay 225, this circuit extending from the negative terminal of the current source by way of the contacts 271, 277, 283 and 293, the number 5 conductor of the conductor group 217a, the winding of the magnet associated with the key 5 in the units key row 21, the conductor 213b, the contacts 226, the conductor 213a and the switch 10c to the positive terminal of the current source. Similarly, circuits commonly including the switch 10c, the conductors 213a and 213b and the contacts 226 of the start relay 225, and individually including certain of the contacts of the translating relays embodied in the tens, hundreds and thousands translating units 207, 208 and 209 are completed for energizing the magnets associated with the six dollar key 6 in the key row 23 and the ten dollar key 10 in the key row 24. In this regard, it will be recalled from the preceding explanation that since the digit 0 is registered in the tens translating unit 207, those relays of this register which are controlled by the relays 20B and 80B of the storage relay group 202 are operated therein, so that no circuit is completed for energizing the electromagnet of any of the keys in the ten cent key row 22.

When energized in the circuits just described, the ten dollar key 10 of the key row 24, the six dollar key 6 of the key row 23 and the five cent key 5 of the key row 21 are depressed in the same manner as if they had been manually actuated, thereby to set up the price designation of $16.05 in the price key array of the register 10. In this connection, it will be understood that with no keys depressed in the ten cent key row 22, the digit 0 is set up in the ten cent decade. At this point, the register 10 is conditioned to enter the price item of $16.05 in the listing totalizer of the register and the particular merchandise class totalizer which has yet to be designated through operation of one of the merchandise class keys 25, 26 and 27.

The start relay 225 in operating to close its contacts 226 also completes an obvious operating circuit for the slow-to-operate control relay 227. The latter relay, in operating to close its contacts 228, completes a circuit for energizing the electromagnet associated with the particular one of the command keys 25, 26, 27 and 28 which corresponds to the command data or digit set up in the translating unit 205. In the case under consideration, where the relay 230 is operated in the command translating unit 205, the command number 17 is entered in this translating unit and a circuit is completed for energizing the electromagnet associated with the grocery key 25 in response to operation of the slow-to-operate control relay 227. This circuit extends from the negative terminal of the current source by way of the contacts 228, 233, 244 and 254, the No. 1 conductor of the conductor group 214, the winding of the magnet associated with the key 25, the conductor 213b, the contacts 226, the conductor 213a and the switch 10c to the positive terminal of the current source. In response to energization of this magnet, the key 25 is depressed to select the grocery totalizer of the register 10 as the one in which the $16.05 price item is to be entered.

Actuation of the grocery key 25 also initiates an operating cycle of the register 10. During this machine operating cycle, the price data set up in the price keys of the machine and more particularly the internal mechanisms associated therewith, is transferred to the listing and grocery totalizers of the machine and is also printed on the sales slip record strip. During the initial portion of the machine operating cycle, the motor shaft extension 10a rotates the switch cam 10b momentarily to open the switch 10c. When this switch is opened, a common point is opened in the operating and locking circuits for all of the relays in the translating and storing apparatus 12, as well as in the circuits for energizing all of the electromagnets associated with the keys of the register 10. As a result, the energized magnets associated with the above identified keys of the register 10 are deenergized and the operated relays in the apparatus 12 are deenergized and restore. Release of the relays 225 and 227 prevents reenergization of any of the key operating magnets of the register 10 upon reclosure of the switch 10c shortly after this switch is opened and before the operating cycle of the machine 10 is completed. Following release of the operated relays in the translating and storing apparatus 12, this apparatus is cleared of the data entered therein and is in readiness to receive and enter additional information under the control of the portable control unit 11. In this regard, it will be noted that the switch 10c is reclosed early in the operating cycle of the register 10 to reprepare the operating and locking circuits for the relays in the apparatus 12, so that additional data may be entered in this apparatus as the operating cycle of the cash register 10 progresses. It will also be understood that as the data set up in the keyboard of the register 10 is transferred to the listing and grocery totalizers of the machine during the operating cycle thereof, the depressed keys of the keyboard are mechanically released and restored to their normal settings. Thus at the end of the operating cycle of the register 10 to perform the functions described above, the machine stands ready to accept additional data from the translating and storing apparatus 12.

The manner in which the meat item of $7.92 is first entered in the apparatus 12 under the control of the portable control unit 11 and then transferred to the cash register 10 when the keys 16 and 2 of the control unit are operated to make the final command number entry of eighteen in the apparatus 12 will be fully apparent from the preceding explanation. In this case, only three price digits are entered in the apparatus 12, these digits being stored in the hundreds, tens, and units section of this apparatus in response to entry of the command digit 18 in the command section of the apparatus. As will be understood, the electromagnets associated with the key 7 of the key row 23, the key 90 of the key row 22, and the key 2 of the key row 21 in the price key array of the register, and the meat key 26 of the command key set, are energized in response to the sequential operation of the start and control relays 225 and 227 which occurs upon entry of the command digit in the command section of the apparatus 12. During the operating cycle of the machine 10 which results from operation of the meat key 26, the price designation, namely, $7.92, is entered in the meat and listing totalizers of the machine and is printed on the sales slip record strip of the machine.

In similar manner, the produce purchase of $4.89 is first entered in the apparatus 12 under the control of the control unit 11 and then transferred to the cash register 10. In this case the magnet associated with the produce key 27 of the command key set in the register 10 is energized to initiate operation of the machine when the keys 16, 1 and 2 of the control unit 11 are depressed and then released to effect entry of the command number 19 in the command section of the apparatus 12 and thereby initiate sequential operation of the start and control relays 225 and 227 in the manner explained above.

In order to obtain a subtotal amount on the three items of purchase thus far discussed, the clerk or operator, without operating the control unit 11 to enter price digits in the apparatus 12, merely operates and then releases the keys 16, 1 and 4 of the control unit 11 to effect energization of the magnet associated with the subtotal key 30 of the register. This occurs in response to the sequential operation of the start and control relays 225 and 227 which results from entry of the command number 21 in the command section of the apparatus 12. During the ensuing operation cycle of the cash register 10, the machine reads the contents of the listing totalizer, representing the subtotal of the three items of purchase, i.e., $28.86, without resetting the listing totalizer to zero. The figures of the subtotal are shown in the indicator, and it is understood that there should be an indicator visible also to the operator of the control unit 11, this unit being a certain distance from the cash register 10. The figures of the subtotal are also printed on the sales slip record strip of the machine.

The next operation to be performed is that of making the tax computation. To this end the operator has a tax schedule close at hand, in which she looks up the tax corresponding to the amount $28.86, which may be assumed to be three percent. The operator then enters the tax item of $.87 into the translating and storage apparatus 12 by manipulating the control unit 11 in the manner described. To enter the amount into the tax totalizer and the listing totalizer of the cash register 10, the keys 16 and 4 of the control unit 11 are operated and then released, to effect entry of the command number 20 into the command section of the apparatus 12, and thus cause the sequential operation of the start and control relays 225 and 227. In this case, the relays 265 and 250 are energized in the command translating unit 205 to effect energization of the magnet associated with the tax key 28 in the command key set of the register 10 in response to operation of the control relay 227. The operating cycle of the register 10 which ensues in response to actuation of the tax key 28 results in the entry of the tax item of $.87 in the listing totalizer of the register and the printing of this tax item on the sales slip record strip of the machine.

The final total on the transaction is obtained through actuation of the keys 16, 2 and 4 of the control unit 11 by the clerk or operator to actuate the total key 29 of the cash register 10 in a manner which will be fully apparent from the preceding explanation. In response to actuation of this key, an operating cycle of the register 10 is initiated during which the total amount of the transaction, i.e., $29.73 is printed on the sales slip record strip of the machine. Incident to the completion of this machine operating cycle, the listing totalizer of the machine is cleared of the information posted therein. Thus the operation of the apparatus illustrated in FIGS. 1 and 2 to perform all computation and posting operations required incident to the transaction under consideration are completed.

From the foregoing explanation, it will be understood that should an error occur in posting price digits in the translating apparatus 12 at any point prior to posting of the cash register command digit in this apparatus, the apparatus 12 may be cleared of all digits entered therein in response to operation and release of the key 16 in the control unit 11. When this key is operated and released, the command section of the translating and storing apparatus 12 functions to produce energization of the correction relay 220 in the manner previously explained. The correction relay, in operating, opens its contacts 221 to interrupt a common point in the operating and locking circuits for all of the relays in the five storage relay groups and five translating units of the apparatus 12, thereby to effect deenergization and release of any relays which may be operated in this apparatus. Thus the apparatus 12 is cleared of any information posted therein and additional and correct data may be entered therein, all without initiating operation of the cash register 10.

Means are provided on the cash register 10 for reading and resetting the transaction totalizers for grocery, meat, produce and tax to zero. However, this is not done by the operator of the control unit 11, and the means for accomplishing this function are not shown in FIG. 1.

Referring now more particularly to FIGS. 6 and 7 of the drawings, the embodiment of the invention there illustrated is generally similar to that shown in FIGS. 1 and 2, and described above, and like the first embodiment may be employed in combination with a cash register of the type which has no mechanical shift mechanism for columnar positioning, but is equipped with command facilities for selecting kinds of operations. One such cash register of this type is disclosed in United States Patent No. 2,309,901, granted February 2, 1943. Only the main shaft 60 and some associated parts of the register are shown in FIG. 7, since in other respects the machine construction may be conventional. As shown in FIG. 7, the main shaft 60 of the machine carries a cam 61 for controlling a cam switch 62 for supplying current to the relays and the control magnets, as well as a stop disc 63 which cooperates with a latch lever 64. This latch lever is releasable by a start magnet S, which by attracting the latch lever, closes a switch 65 for starting the motor (not shown) for driving the main shaft 60.

As shown in FIG. 6, the general arrangement of the portable control unit 11, comprising the control keys 1, 2, 4 and 8 is the same as the control unit of FIG. 1, except that the thumb key 16 is omitted and only four finger keys are provided. The storage apparatus 12A generally comprises a number of storage relay groups 200A, 201A, 202A, 203A, etc., which are controlled over the control channels of the cable 13 by the four keys of the control unit 11, and in turn control corresponding mechanical translating units 0C, 1C, 10C and 100C over the four sets of code conductors 15a, 15b, 15c and 15d. The circuit arrangement of the four storage relay groups 200A, 201A, 202A, 203A, etc., is substantially identical with that of the storage relay groups embodied in the apparatus 12, except that the command storage relay group 206A comprises only four digit storage stages instead of five, and the wiring of the correction relay D and the command relays D1, D2, D4 and D8 associated with the storage relay group 201A is somewhat different. It should also be noted that when a single command relay is operated and when command relays in combinations representative of numbers of less than 12 are operated, no operation of the start magnet S and the translating units 0C, 1C, 10C and 100C will take place, nor will the correction relay D operate.

Referring now more particularly to the mechanical translating units 0C, 1C, 10C and 100C, it is pointed out that these units are substantially identical in construction. The details of one translating unit, generally designated at C, are shown in FIGS. 8, 9 and 10 of the drawings. Briefly, this unit comprises a series of parallel movement-transferring or set-up bars MC1, MC2, MC4 and MC8 each of which corresponds to one of the code keys 1, 2, 4 and 8 in the control unit 11, as well as to the set-up and storing pawls A1, A2, A4 and A8. The individual set-up bars are supported on stationary pins 33 by means of slots 31, 32, 34 and 38 which are of different lengths. The bar MC8 is shown as being provided with a nib 35, but this nib is merely of symbolic nature, indicating, in cooperation with the digit row 0–15, that the output bar MC8 can be caused to occupy sixteen different positions respectively representing the numbers 1 to 16, inclusive. Upon release, the output bar MC8 is actuated by a spring 36, which tends to move the bar in the direction of the arrow from the position of rest 0 into the position 15. However, in the position of rest such movement is prevented through engagement of a locking finger A8' on the coupling pawl A8 with a locking projection 39 on the next preceding bar MC4, this engagement being maintained by an associated pawl biasing spring 37. Normally, movement of the bar MC4 under the influence of the spring 36 and the bar MC8 is prevented through engagement of the locking finger A4' on the coupling pawl A4 with the locking projection 39 on the next preceding bar MC2, this engagement being maintained by an associated pawl biasing spring 37. Movement of the bar MC2 is normally prevented through engagement of the locking finger A2' of the coupling pawl A2 with the locking projection 39 on the next preceding bar MC1, this engagement being maintained by an associated pawl biasing spring 37. Finally, movement of the bar MC1, and thereby all of the remaining bars, is prevented through engagement of the locking finger A1' of the coupling pawl A1 with a locking projection 39 on a special stationary locking bar 40, this engagement being maintained by an associated pawl biasing spring 37. Relative movement between the bars MC8, MC4, MC2 and MC1 under the influence of the spring force 36 is limited through engagement of a stop lug 42 on the bar MC8 with a lug 43 on the bar MC4, by engagement of a stop lug 42 on the last-mentioned bar with a similar lug 43 on the bar MC2, by engagement of a stop lug 42 on the last-mentioned bar with a similar lug 43 on the bar MC1 and finally by engagement of a stop lug 42 on the last-mentioned bar with a similar lug 43 on the stationary locking bar 40. The normal positions of the four bars MC1, MC2, MC4 and MC8 are established through engagement of the respective lower ends thereof with stop lugs 41 respectively provided at the lower ends of the bars 40, MC1, MC2 and MC4.

For the purpose of selectively operating the pawls A1', A2', A4' and A8' to effect increments of movement of the output bar MC8 to any one of the fifteen different off-normal positions thereof, operating magnets S1, S2, S4 and S8 are respectively associated with the four pawls A1, A2, A4 and A8. These four magnets, for each translating unit are adapted to be wired into the system in the manner shown in FIGS. 6 and 7. In order to hold the pawls A1, A2, A4 and A8 in their operated positions after operation thereof by the magnets S1, S2, S4 and S8, these pawls have locking pawls M1, M2, M4 and M8 respectively associated therewith.

Referring now more particularly to the operation of the translating unit C, it will be understood that when the magnet S8 is energized to effect rotation of the pawl A8 against the bias of its associated spring 37, the locking finger A8' is disengaged from the locking projection 39 on the bar MC4 to release the bar MC8. As best shown in FIG. 9, pivotal movement of the pawl A8 to its operated position under the influence of the magnet S8 frees the locking pawl M8 for clockwise pivotal movement under the influence of its associated biasing spring. As the pawl pivots clockwise to bear against its stop, the latching end thereof moves behind the lower end of the pawl A8 to hold the latter pawl operated after the magnet S8 is deenergized. It will be noted that with the pawl A8 held in its operated position by the pawl M8, a substantial clearance is provided between the locking finger A8' and the locking projection 39 on the bar MC4.

When thus released, the bar MC8 is conditioned to move upward under the influence of the spring 36 until the stop lug 42 of the bar engages the stop lug 43 on the bar MC4. Similarly, the bars MC4, MC2 and MC1 are released and conditioned to move upwardly predetermined different increments which are determined by the relative spacings of their associated stop lugs 42 and 43 in response to energization of their respective associated magnets S4, S2 and S1. The distance between the lug 42 on the bar MC1 and the lug 43 on the stationary bar 40 represents one step of movement of the nib 35 (from 0 to 1) inasmuch as the bar MC1 when displaced under the influence of the spring 36 drives the other three bars through the engaged lugs 41. The distance between the lug 42 on the bar MC2 and the lug 43 on the bar MC1 corresponds with two steps of movement of the nib 35 inasmuch as the bar MC2 when displaced relative to the bar MC1 under the influence of the spring 36 drives the two bars MC4 and MC8. In similar manner, the distance between the lug 42 on the bar MC4 and the lug 43 on the bar MC2 corresponds with four steps of movement of the nib 35, and finally the distance between the lug 42 on the bar MC8 and the lug 43 on the bar MC4 corresponds with eight steps of movement of the nib 35. Thus by adding the individual steps of movement a maximum of fifteen different off-normal settings or positions of the output bar MC8 can be obtained, in addition to the initial position. More specifically the numerical designations obtained through selective release of the bars MC1, MC2, MC4 and MC8 in the manner described above is given by the following table:

| Magnets Energized | Bars Operated | Number Represented |
|---|---|---|
| None | None | 0 |
| S1 | MC1 | 1 |
| S2 | MC2 | 2 |
| S1 and S2 | MC1 and MC2 | 3 |
| S4 | MC4 | 4 |
| S1 and S4 | MC1 and MC4 | 5 |
| S2 and S4 | MC2 and MC4 | 6 |
| S1, S2 and S4 | MC1, MC2 and MC4 | 7 |
| S8 | MC8 | 8 |
| S1 and S8 | MC1 and MC8 | 9 |
| S2 and S8 | MC2 and MC8 | 10 |
| S1, S2 and S8 | MC1, MC2 and MC8 | 11 |
| S4 and S8 | MC4 and MC8 | 12 |
| S1, S4 and S8 | MC1, MC4 and MC8 | 13 |
| S2, S4 and S8 | MC2, MC4 and MC8 | 14 |
| S1, S2, S4 and S8 | MC1, MC2, MC4 and MC8 | 15 |

Restoration of the bars MC1, MC2, MC4 and MC8 to their respective normal settings following operation thereof to off-normal settings in the manner described above is effected by pushing down on the output bar MC8 in the manner described below in connection with FIG. 7 of the drawings. As the bar MC8 is moved downwardly against the action of the spring 36, the downward movement is transmitted through the ends of the bars which have been operated and their respective associated lugs 41 to the adjacent bars so that all operated bars are returned to their respective normal settings. As the bars which have been operated to off-normal settings are returned to their normal settings the locking fingers of the locking pawls associated therewith ride over their respective associated locking projections 39 on the adjacent bars to lock the bars in their respective normal positions. More specifically and as best shown in FIGS. 10 and 11, as the bar MC8, for example, is moved downwardly relative to the bar MC4, the finger A8' rides over the cam surface of the projection 39 on the bar MC4. As a consequence, the pawl A8 is partially moved toward its off-normal position, but not enough to pivot the lower end thereof out of the path of engagement with the latching pawl M8. Hence, during the final part of the return movement of the bar MC8, the latching pawl M8 is pivoted back to its normal position and does not interfere with pivotal movement of the pawl A8 back to its normal locking position under the influence of the spring 37.

In considering the operation of the system illustrated in FIGS. 6 and 7, it may be assumed that price designation of one dollar and twenty six cents is to be entered in the cash register embodied in the system. To effect entry of this price item in the register, the keys 1, 2 and 2 and 4 of the control unit 11 are sequentially depressed and then released in the order named. When the key 1 of the control unit 11 is depressed, the relay M0 is energized in series with the relay 01A in the storage relay group 200A over a circuit which includes the cable conductors 13a and 13b. In operating, the relay M0 first closes the contacts M01 of its make before break spring combination to prepare operating circuits for the A relays of the other storage relay groups and then opens its contacts M02 to interrupt the common portion of the operating circuits for the B relays of the several relay groups. The slow-to-release relay 01A, upon operating, closes its contacts 01A1 to prepare the operating circuit for the relay 01B. Following operation of the two relays M0 and 01A and when the operator releases the key 1 of the control unit 11, the relay M0 immediately restores and closes its contacts M02 to complete the prepared operating circuit for the relay 01B, this circuit extending from the negative terminal of the current source by way of the contacts M02, the winding of the relay 01B and the contacts 01A1, *d* and 62 to the positive terminal of the current source. In operating, the relay 01B closes its contacts 01B1 and 01B2 to complete a locking circuit for itself which extends from the negative terminal of the current source by way of the contacts M02, the winding of the relay 01B, and the contacts 01B1, 01B2, *d* and 62 to the positive terminal of the current source. At its contacts 01B2, the relay 01B also prepares the operating circuit for the slow-to-release relay 1A in the units storage relay group 201A. At its contacts 01B3, the relay 01B prepares the operating circuit for the magnet S1 of the command translating unit 0C and completes an operating circuit for the relay D1, the latter circuit extending from the negative terminal of the current source by way of the winding of the relay D1, and the contacts 01B3, *d* and 62 to the positive terminal of the current source. The resulting operation of the relay D1 does not result in energization of the magnet S1 in the command translating unit 0C, for the reason that the relays in the command group 0 must be energized in a combination representing a number having a numerical value of not less than 12 in order to effect energization of any of the S magnets in any of the translating units. Shortly following operation of the relay 01B, the slow-to-release relay 01A releases, but such release is without effect, since this relay's sole function is that of effecting energization of the fast acting relay 01B. At this point in the operation of the system, the relay 01B is operated and the digit 1 is stored in the apparatus 12A, but not in the proper decade, since it belongs in the hundreds decade and is now registered in the command storage relay group 200A.

When the key 2 of the control unit 11 is depressed, to register the digit 2 in the storage apparatus 12A, the relay M0 is energized in series with the relay 02A of the command relay group over a circuit which extends from the negative terminal of the current source by way of the winding of the relay 02A, the conductor cable 13*c* and 13*a*, and the winding of the relay M0 to the positive terminal of the current source. Operation of the relay M0 also effects energization of the slow-to-release relay 1A in the units relay group over a circuit which extends from the negative terminal of the current source by way of the contacts M01, the winding of the relay 1A and the contacts 01B2, *d* and 62 to the positive terminal of the current source. In operating, the relay 1A locks up through its two sets of make contacts, and the contacts M01, *d* and 62, and at its lower set of make contacts prepares the operating circuit for its associated relay 1B. The relay 02A, in operating, prepares the operating circuit for its associated register relay 02B in the exact manner described above with reference to the two relays 01A and 01B. Shortly following operation of the relays 02A and 1A, the contacts M02 of the relay M0 are opened to deenergize the relay 01B. This relay, in releasing, opens the operating circuit for the relay 1A and deenergizes the relay D1 which also restores.

When the operator releases the key 2 of the control unit 11, the relay M0 is deenergized and restores. In releasing, this relay closes its contacts M02 to energize the relays 1B and 02B in a manner which will be clearly understood from the preceding explanation. Thereafter, the relay M0 opens its contacts M01 to deenergize the relay 02A and 1A. In operating, the relay 02B locks up in a circuit which includes the contacts *d* and 62, and completes the operating circuit for the relay D2. The latter relay, in operating, performs no function at this time. With the relay 1B operated in the units storage relay group 201A at the time the key 2 of the control unit 11 is released, a locking circuit for this relay is completed at the contacts M02 upon release of the relay M0. With the relay 1B operated, circuits are prepared at the middle and lower make contacts thereof for energizing the slow-to-release relay 10A in the tens storage relay group 202A and the magnet S1 in the translating unit 1C. At this point in the operation of the system, the digit 1 is entered in the units storage relay group 201A and the digit 2 is entered in the command storage relay group 200A. Hence, two further digit transfer operations are required in order to shift these two digits to their proper decades in the apparatus 12A.

In order to enter the digit 6 of the number 126 in the translating apparatus, the keys 2 and 4 of the control unit 11 are depressed and then released. In response to operation and release of these two keys, the relay 10B is operated in the tens relay group, and the relay 1B is released in the units relay group, thereby to transfer the digit 1 from the units storage relay group 201A to the tens storage relay group 202A; the relay 2B is operated in the units storage relay group to store the digit 2 in this group and the relay 02B and 04B are operated in the command storage relay group 200A to store the digit 6 in this group. In addition, the command relays D2 and D4 are operated in the command control group, but operation of these two relays at this time is without effect, since the numerical value of the digit thus set up therein is less than 12. At this point in the operation of the apparatus, the digits of the price designation $1.26 are stored in the apparatus 12A, but not in the proper decades.

In order to effect the final digit transfer operation and to initiate operation of the machine to register the number set up in the translating apparatus, the attendant simultaneously operates and then releases the keys 4 and 8 of the control unit 11, assuming that the code combination 12 represents the kind of machine operation to be performed. In response to operation and release of these two keys in the control unit 11, the stored digits of the price designation are each transferred one decade in the manner described above, so that the digit 1 is stored in the hundreds storage relay group 203A, the digit 2 is stored in the tens storage relay group 202A through operation of the relay 20B and the digit 6 is stored in the units storage relay group 201A through operation of the relays 2B and 4B. With these B relays operated in the storage groups, operating circuits for the control magnet S1 in the translating unit 100C, the control magnet S2 of the translating unit 10C and the control magnets S2 and S4 in the translating unit 1C are prepared. Incident to operation of the keys 4 and 8 in the control unit 11, the previously operated command relays D2 and D8 are released.

Operation and release of the keys 4 and 8 in the control unit 11 also results in operation of the relays 04B and 08B in the command storage relay group 200A. In operating, these relays prepare operating circuits over two of the conductors in the cable 15*a* for the control magnets S4 and S8 in the translating unit 0C. Operation of the relay 04B and 08B in the command storage relay group 200A also results in energization and operation of the two command relays D4 and D8 in a manner which will be clearly apparent from the preceding explanation. Operation of these command relays results in initiating operation of the machine to register the stored price designation in the machine. More specifically, these two relays, in operating, complete a circuit for energizing the machine start magnet S, this circuit extending from the negative terminal of the current source, through the operated make contacts of the relays D4 and D8 and the winding of the start magnet S to the positive terminal of the current source. Coincident with energization of the machine start magnet S, the control magnets S4 and S8 in the translating unit 0C, the control magnets S2 and S4 in the translating unit 1C, the control magnet S2 in the translating unit 10C, and the control magnet S1 in the translating unit 100C are all simultaneously energized. These control magnets are energized in circuits which commonly include the closed make contacts of the relays D4 and D8 and the contacts 62 and *d*, and individually include the closed make contacts of the operated B relays in the command, units, tens and hundreds storage relay groups 200A, 201A, 202A and 203A and the corresponding conductors of the cables 15a, 15b, 15c and 15d. When the identified control magnets are thus energized in the translating units 0C, 1C, 10C and 100C, the pawls A4 and A8 in the command unit 0C, the pawls A2 and A4 in the translating unit 1C, the pawl A2 in the translating unit 10C and the pawl A1 in the translating unit 100C are all moved to their respective off-normal positions and latched in these positions in the manner explained above with reference to FIGS. 8, 9, 10 and 11 of the drawings. As a consequence, the bars MC4 and MC8 of the translating unit are released to permit twelve steps or increments of linear movement of the output bar MC8 during operation of the machine. Similarly, the bars MC2 and MC4 in the translating unit 1C are released to permit six steps of the output bar MC8 in the units translating unit 1C; the bar MC2 of the translating unit 10C is released to permit two steps of the bar MC8 in the tens translating unit 10C; and the bar MC1 of the hundreds translating unit 100C is released to permit one step of the output bar MC8 in this unit. However, the described linear movements of the output bars in the four translating units are momentarily restrained by the levers 66 embodied in the cash register, due to engagement of the ends of these levers with holding projections 67 on the respective associated output bars, until such time as the machine starts to operate in response to operation of the start magnet S.

When energized in the manner explained above, the start magnet S attracts its armature 64 to withdraw the armature latch from engagement with the stop disc 63 and thus free the main shaft 60 for rotation, and to close the switch 65 for energizing the driving motor (not shown) for the main shaft of the machine. When the main shaft 60 of the machine starts rotating, the cam portion of the disc 61 momentarily engages the operating spring of the switch 62, whereby these contacts are opened to deenergize all of the operated A, B and D relays as well as the operated S magnets in the four translating units. Thus all operated ones of these relays and magnets are released.

During each operating cycle of the machine, the main shaft 60 is rotated through one complete revolution. During the first half revolution of this shaft, all of the levers 66 associated with the translating units 0C, 1C, 10C and 100C are lifted or rotated counter-clockwise as shown in FIG. 7 until they occupy the illustrated dash line positions thereof. In this regard, it will be understood that since the pawls A4 and A8 are latched in their off-normal settings in the command translating unit 0C, the output bar MC8 of this unit follows its associated lever 66 upward until it has moved twelve steps correspondingly to position the kind of operation selecting bar 68. In response to this operation of the control rod 68 through twelve increments of upward movement, a shaft for selecting the kinds of operation, such as described in the above-mentioned U.S. Patent No. 2,309,901, is rotated through a corresponding angle to register the kind of operation to be performed by the cash register. This occurs during the first half revolution of the main shaft 60 embodied in the machine. During the same interval, the output bar MC8 of the units translating unit 1C is moved six steps upward under the influence of its associated spring 36; the output bar MC8 of the tens translating unit 10C is moved two steps upward; and the output bar MC8 of the hundreds translating unit 100C is moved one step upward.

Immediately the first half revolution of the main shaft 60 is completed, the kind of operation, namely registering, is selected. More specifically, the registering totalizers are selected, and through operation of their respective associated movement transmitting mechanisms 70, the input pinions 69 thereof are moved into engagement with the rack sections 35' of the output bars MC8 in the units, tens and hundreds translating units 1C, 10C and 100C. After the totalizer input pinions 69 are engaged with the rack sections 35' of the output bars in the units, tens and hundreds translating units 1C, 10C and 100C, and during continued rotation of the main shaft 60, the levers 66 are rotated back to the home positions thereof illustrated in full lines in FIG. 7 of the drawings. Incident to such clockwise rotation of these levers, the output bars MC8 of the translating units 0C, 1C, 10C and 100C are returned to their respective normal settings along with the other operated bars of these translating units. During the final return movement of the operated bars in the four translating units, the pawls respectively associated therewith are reset so that once the bars reach their normal positions they are latched in these positions.

During the return or homing movement of the output bars in the three translating units 1C, 10C and 100C, the output bar in the units translating unit 1C, is, of course, moved six steps or increments of movement to impart a corresponding angular setting to the totalizer input pinion 69 and thus set up the digit 6 in the totalizer controlled by this pinion. Similarly, the output bar MC8 of the tens translating unit 10C is moved two steps and in so doing rotates the input pinion 69 to enter the digit 2 in the tens totalizer controlled by this pinion. Finally, the output bar of the hundreds translating unit 100C moves one step in returning to its home position so that the digit 1 is entered in the hundreds totalizer controlled by this unit. Thus the number 126 is entered in the registering totalizers of the cash register. During the homing movement of the output bar MC8 embodied in the command translating unit 0C, the control rod 68 is, of course, restored to its normal setting.

Upon completion of one revolution of movement of the main shaft 60 to complete the above-described operating cycle of the cash register, the latch part of the start magnet armature 64 drops into the stop slot of the disk 63 to arrest the operation of the register. Coincident with this operation, the switch 65 is opened to deenergize the driving motor for the main shaft 60.

From the foregoing explanation, it will be understood that the cam switch 62 is only momentarily operated to deenergize the operated relays and magnets of the translating equipment, as well as the start magnet S of the cash register, during the initial part of an operating cycle of the cash register to enter within the selected cash register totalizers the information set up in the translating units 0C, 1C, 10C and 100C. Because of this fact, none of the A, B and D relays are energized during operation of the cash register to clear the translating units of the information set up in these units. Accordingly, the digit entries pertaining to a second price designation can be set up in the command, units, tens and hundreds storage relay groups while the cash register is operating to clear the translating units 0C, 1C, 10C and 100C. This new set-up operation is, of course, achieved through appropriate manipulation of the keys in the control unit 11 in the desired coded combinations. Thus by virtue of the storage feature obtained by embodying the command, units, tens and hundreds relay groups 200A, 201A, 202A and 203A in the storage apparatus 12A, the maximum potential of the cash register in terms of the number of price designations which may be entered therein during a given time interval, may be fully realized.

As will be understood from the above explanation, after the price designation of $1.26 has been registered in the cash register, further price designations can be successively registered in the cash register in the same manner. When the desired number of price designations, representing a complete sales transaction to a customer, have been registered in the cash register, the total can be obtained or the listing totalizer of the machine may be reset to zero by entering the code combinations representing the numbers 13 and 14, respectively, in the command storage relay group 200A through proper manipulation of the keys in the control unit 11. Thus if the number 13 is entered in the command relay group, the command relays D1, D4 and D8 are operated at the end of the digit entry operation. With the relays D4 and D8 energized, operation of the cash register to clear the command translating unit 0C of the number 13 set up therein is initiated. Alternatively, if the number 14 is entered in the command storage relay group 200A, the relays 02B, 04B and 08B are operated in this relay group to prepare operating circuits for the magnets S2, S4 and S8 of the command translating unit 0C and to complete operating circuits for the relays D2, D4 and D8 in the command control relay group. Again, the relays D4 and D8, in operating, immediately initiate operation of the cash register to clear the command translating unit 0C of the command number 14 set up therein.

As indicated above, in the event an error is committed on the part of the operator in setting up a number in the translating apparatus, this apparatus may be reset to normal without initiating operation of the cash register by entering the number 11 in the command storage relay group 200A. This, of course, is effected by depressing and then releasing the keys 1, 2 and 8 of the control unit 11. When these keys are operated and then released, the 01B, 02B and 08B relays of the command relay group are operated to effect energization and operation of the relays D1, D2 and D8 in the command relay group. The last three identified relays, in operating, complete an obvious circuit for energizing the relay D. In operating, the relay D opens its contacts d to interrupt a common point in the operating and locking circuits for all operated relays in the storage apparatus 12A. Thus this equipment is reset to normal in condition to store additional numerical data under the control of the control unit 11 without effecting operation of the associated cash register.

Although the embodiment of the invention illustrated in FIGS. 6, 7, 8, 9, 10 and 11 of the drawings has been described with particular reference to the handling of three digit numbers, namely, numbers characterized by units, tens and hundreds digits, it will be understood that additional decades may be added to the storage and translating equipment if required to control all of the decade positions of a particular cash register. The possibility of such additions of storage relay groups and translating units is indicated by the arrows extending to the left from the hundreds storage relay group 203A.

Cash registers of the type illustrated in FIG. 1 are universally equipped with a full array of price keys so that any price designation, the digits of which are within the decade capacity of the machine, may be directly set up on the price keys of the register. In such a machine facilities are not required or provided within the machine for transfer or carryover operations from decade to decade of the totalizers in response to successive operations of the price keys without operation of one or more of the command keys. Hence, it is necessary to provide in the translating and storing apparatus 12 the described facilities for transferring the digits from decade to decade as new digits of a price designation are received from the control unit 11 over the cable 13. However, in other types of registers which are commonly used in store operations, the machines are equipped with only ten number keys representing the digits 1 to 9 and 0, and facilities are provided within the machine itself for transferring digits from decade to decade as the number keys are successively operated. Such machines are also equipped with an assortment of command keys, which may correspond in part, for example, to the command keys of the register 10 shown in FIG. 1 of the drawings.

In providing the present improved apparatus to control a machine of the last-described type, the apparatus may be considerably simplified since digit transferring and storing facilities are not required therein. Referring now more particularly to FIGS. 12 and 13 of the drawings, the machine 10d shown in FIG. 12 is of the ten number key type just referred to, the keyboard comprising the number keys 1 to 9 and 0 and four command keys, 11, 12, 13 and 14. More specifically, the command key 11 is the start key of the machine, namely, the key which is depressed to cause registration of a price designation entered in the machine through operation of the number keys and printing of this designation on the charge slip record strip. The keys 12, 13 and 14 are subtotal, total and correction keys, respectively. Each key is provided with an electromagnet which, when energized, causes the key to be depressed in the same manner as if the key were manually actuated. The machine 10d is also equipped with a motor shaft which is motor-driven through one complete revolution in response to operation of any one of the command keys 11, 12, 13 and 14. This shaft is provided with an extension 10e which carries a cam 10f for controlling a cam switch 10g associated therewith.

In order selectively to control the actuation of the keys embodied in the machine 10d from a remote point while permitting the clerk or machine operator to move around and use both hands in the handling of merchandise being sold, translating apparatus 12B is provided which is arranged to be seectively controlled over the flexible cable 13 by the portable control unit 11. The control unit 11 is identical with that described above and illustrated in FIGS. 3, 4 and 5 of the drawings, except that the thumb key 16 is omitted therefrom. As will be apparent from the preceding explanation, the purpose of the translating apparatus 12B is that of translating binary signals transmitted thereto over the cable 13 from the portable control unit 11 into decimal form so that price and command information may be entered in the machine 10d through selective individual actuations of the price and command keys of the machine. To this end, the translating apparatus 12B embodies four translating relays 1300, 1320, 1340 and 1360, each of which is of the slow-to-release type and the contacts of which are wired as shown in FIG. 13 to perform the desired code translating operations. The translating apparatus 12B further comprises a control relay M0 which has the primary function of preventing any of the electromagnets associated with the keys of the machine 10d from being energized until the keys of the portable control unit 11 have been operated and then released.

Referring now more particularly to the operation of the apparatus illustrated in FIGS. 12 and 13 of the drawings, it may be assumed that the price designation of $16.05 is to be entered in the machine 10d. In order to enter the first digit 1 of this price designation in the first decade of the machine 10d, the clerk or operator depresses the key 1 of the control unit 11. When this key is depressed, a circuit including the cam switch 10g and the cable conductors 13a and 13b is completed for energizing the relay M0 in series with the left winding of the relay 1300. When thus energized, the relay M0 immediately opens its contacts M01 to interrupt a common point in the locking circuits for the four translating relays 1300, 1320, 1340 and 1360, as well as a common point in the circuits for selectively energizing the electromagnets associated with the keys of the machine 10d. Shortly following operation of the relay M0, the relay 1300 operates and closes its contacts 1301 to prepare a locking circuit for itself. At its other contacts, the relay 1300 opens and closes points in the respective circuits for energizing the magnets associated with the fourteen keys of the machine 10d. Nothing further happens in the translating apparatus 12B until such time as the key 1 of the control unit 11 is released.

In this regard, it will be noted that if the key 1 of the control unit 11 is erroneously operated and the operator intended to actuate the key 2 instead, the shift may easily be accomplished by simply holding the key 1 down, depressing the key 2 and then releasing the key 1. In response to such key operations, the left winding of the relay 1320 is energized in series with the relay M0 over the cable conductor 13c, the relay 1300 is deenergized and restores upon release of the key 1 and the relay M0 remains operated throughout the described key operations. Thus any desired shift in the settings of the keys in the control unit 11 may be accomplished by appropriate finger manipulation of these keys so long as one of the keys is held depressed to maintain the relay M0 energized, thereby to hold open the locking circuits for the four translating relays and the circuits over which the magnets associated with the keys of the machine 10d are energized.

Continuing with the example under consideration, when the key 1 of the control unit 11 is released, the circuit for energizing the left winding of the relay 1300 in series with the operating winding of the relay M0 is broken. Accordingly, the relay M0 immediately restores to complete the prepared locking circuit for the relay 1300, this circuit extending from the negative terminal of the current source by way of the right locking winding of the relay 1300, the contacts 1301 and M01, and the switch 10g to the positive terminal of the current source. In releasing, the relay M0 also completes the prepared circuit for energizing the magnet associated with the key 1 in the machine 10d, this circuit extending from the positive terminal of the current source by way of the switch 10g, the contacts M01, 1363, 1345, 1329 and 1316, and the winding of the magnet associated with the key 1 to the negative terminal of the current source. When energized in this circuit, the magnet associated with the key 1 in the machine 10d functions to depress this key and enter the digit 1 in the first decade of the machine exactly as if this key had been manually actuated.

In order to enter the second digit 6 of the exemplary price designation in the machine 10d, the keys 2 and 4 of the control unit 11 are depressed and then released. When these keys are operated, the relay M0 is energized in series with the left operating windings of the two relays 1320 and 1340 over circuits which include the cam switch 10g and the cable conductors 13a, 13c and 13d. When thus energized, the relay M0 immediately operates and opens its contacts M01 to deenergize the relay 1300, thereby to effect the release of the latter relay, and to deenergize the magnet associated with the key 1 of the machine 10d. The relay 1300 opens its contacts 1316 further to interrupt the circuit for energizing the magnet associated with the key 1 of the machine 10d. Shortly following operation of the relay M0, the relays 1320 and 1340 operate, close their contacts 1321 and 1341 to prepare locking circuits for themselves, and in combination prepare the circuit for energizing the magnet associated with the key 6 of the machine 10d. This circuit is completed at the contacts M01 of the relay M0 in response to release of the keys 2 and 4 of the control unit 11 to effect deenergization and release of the relay M0, and extends in part from the positive terminal of the current source by way of the cam switch 10g and the contacts M01, 1363, 1344, 1326 and 1311 to the number 6 conductor of the cable connecting the translating apparatus 12B with the electromagnets associated with the keys of the machine 10d. Incident to energization of the magnet associated with the key 6 of the machine 10d, this key is depressed to effect transfer of the previously entered digit 1 from the first decade totalizer of the machine to the second decade totalizer and to enter the digit 6 in the first decade totalizer. Thus the first two digits 1 and 6 of the exemplary price designation are entered in the machine 10d.

In order to enter the third digit 0 in the machine, the keys 2 and 8 of the control unit 11 are depressed and then released. In response to actuation of these keys to their respective off-normal settings, the left operating windings of the relays 1320 and 1360 are energized in series with the M0 relay over circuits which include the cable conductors 13a, 13c and 13e. In response to the resulting operation of the relay M0, the circuit for energizing the magnet associated with the key 6 of the machine 10d is broken and the locking winding for the relay 1340 is interrupted to effect restoration of this relay. The relay 1320 remains operated due to reenergization of its operating winding over the cable conductor 13c even though the locking circuit for this relay is broken at the contacts M01 in response to operation of the relay M0. With the relays 1320 and 1360 operated, locking circuits for these relays are prepared at the contacts 1321 and 1361 thereof, and a circuit is prepared for energizing the key 0 of the machine 10d. This circuit is completed in response to the deenergization and release of the relay M0 which occurs in response to release of the keys 2 and 8 of the control unit 11. More specifically, the relay M0, upon restoring, closes its contacts M01 to complete the prepared locking circuits for the relays 1320 and 1360, and also completes the prepared circuit for energizing the magnet associated with the key 0 of the machine 10d, the latter circuit extending from the positive terminal of the current source by way of the switch 10g and the contacts M01, 1362, 1343, 1324 and 1307, and the winding of the magnet associated with the key 0 to the negative terminal of the current source. When the magnet associated with the key 0 of the machine 10d is thus energized, the digit 0 is entered in the first decade of the machine, the digit 6 is transferred to the second decade of the machine and the digit 1 is transferred to the third decade of the machine. The relays 1320 and 1360 of the translating apparatus 12B, together with the magnet associated with the key 0 of the machine 10d are held energized until another digit is entered in the translating apparatus 12B through further operation of the control unit 11.

In order to enter the final digit 5 of the exemplary price designation under consideration in the machine 10d, the keys 1 and 4 of the control unit 11 are depressed and then released. When these keys are operated off-normal, the left operating windings of the relays 1300 and 1340 are energized in series with the relay M0 over circuits which will be fully apparent from the above explanation. In operating, the relays 1300 and 1340 close their respective contacts 1301 and 1341 to prepare locking circuits for themselves, and in combination, prepare the circuit for energizing the magnet associated with the key 5 of the machine 10d. It will be understood that prior to operation of these two translating relays, the relay M0 operates and opens its contacts M01 to deenergize the magnet associated with the key 0 of the machine 10d, prevent energization of the identified key magnet and to interrupt the locking circuits for the operated translating relays 1320 and 1360. The latter relays, in restoring, further prepare the circuit for energizing the magnet associated with the key 5 of the machine 10d and further interrupt their own locking circuits.

Upon release of the keys 1 and 4 in the control unit 11 by the operator, the relay M0 restores and closes its contacts M01 to complete the locking circuits for the relays 1300 and 1340 and to complete the prepared circuit for energizing the magnet associated with the key 5 of the machine 10d, the latter circuit extending from the positive terminal of the current source by way of the switch 10g, the contacts M01, 1363, 1344, 1327 and 1312, the number 5 conductor of the cable connecting the translating apparatus 12B with the magnets associated with the keys of the machine 10d, and the winding of the magnet individually associated with the key 5 of this machine to the negative terminal of the current source. When its associated magnet is thus energized, the key 5 is actuated to enter the digit 5 in the first decade of the machine, and to transfer the previously entered digits 0, 6 and 1 to the second, third and fourth decades of the machine in the order named. Following operation of the key 5 in the machine 10d, the full price designation has been entered therein and the machine stands ready to receive the command to register and print this designation. At this point in the operation in the apparatus, the translating relays 1300 and 1340 of the translating apparatus 12B are operated and the magnet associated with the key 5 of the machine 10d is energized.

In order to effect registry of the price designation in the machine 10d, the operator depresses and then releases the keys 1, 2 and 8 to enter the digit 11 in the translating apparatus 12B. When these keys are depressed in the control unit 11, the operating windings of the translating relays 1300, 1320 and 1360 are energized in series with the relay M0 over circuits which will be fully apparent from the above explanation. When thus reenergized, the relay M0 opens its contacts M01 to deenergize the magnet associated with the key 5 of the machine and to interrupt the locking circuit for the relay 1340, causing the latter relay to restore. The relay 1300 remains operated and the relays 1320 and 1360, upon operating, prepare circuits for energizing their respective locking windings and also prepare the circuit for energizing the magnet associated with the start key 11 of the machine 10d.

When the keys 1, 2 and 8 of the control unit 11 are released, the relay M0 is deenergized and closes its contacts M01 to complete the prepared locking circuits for the translating relays 1300, 1320 and 1360. In releasing, the relay M0 also completes the prepared circuit for energizing the magnet associated with the start key 11 of the machine 10d, this circuit extending from the positive terminal of the current source by way of the switch 10g, the contacts M01, 1362, 1343, 1324 and 1306, the number 11 conductor of the cable interconnecting the translating apparatus 12B with the magnets associated with the keys of the machine 10d and the winding, not shown, of the magnet associated with the key 11 of the machine 10d to the negative terminal of the current source. When its associated magnet is thus energized, the command key 11 is actuated to initiate operation of the machine 10d to register the price designation of $16.05 in the totalizers thereof and to print this designation on the sales slip record strip. Incident to such operations of the machine, the motor shaft and the extension 10e thereof are rotated through a complete revolution. During the initial rotation of the shaft 10e, the cam 10f functions to effect opening of the cam switch 10g to interrupt the operating and locking circuits for all of the relays in the translating apparatus 12B as well as all of the circuits for energizing the magnets associated with the keys of the machine 10d. As a consequence, the relays 1300, 1320 and 1360 of the apparatus 12B are deenergized and restore, and the magnet, not shown, associated with the key 11 of the machine 10d is deenergized.

During the ensuing operating cycle of the machine, the exemplary price designation of $16.05 is entered in the totalizers thereof and printed on the sales slip record strip, following which the key mechanisms of the machine are cleared of the information or data stored therein. As the operating cycle of the machine is completed, the cam 10f carried by the motor shaft extension 10e is rotated back to its normal setting to reclose the switch 10g and thus reprepare the operating and locking circuits for the relays of the translating unit 12B and the circuits for energizing the magnets associated with the keys of the machine.

The manner in which other price designations may be entered in the machine through response of the translating apparatus 12B to finger manipulation of the control unit 11 will be fully apparent from the preceding explanation, it being pointed out that circuits for energizing the magnets associated with the respective price and command keys of the machine 10d are in each case completed through the contacts of the four translating relays in the apparatus 12B, with different combinations of these four relays operated, upon release of the respective corresponding keys in the control unit 11 to produce deenergization of the relay M0. In this regard, it will be understood that in order to effect operation of the subtotal key 12 in the machine 10d after a number of price designations have been registered in the machine, it is necessary to actuate and then release the keys 4 and 8 of the control unit 11, thereby to effect energization of the magnet associated with the key 12 of the machine 10d. Similarly, if it is desired to obtain the total of a number of price designations registered in the machine 10d, operation of the total key 13 in the machine may be effected by operating and then releasing the keys 1, 4 and 8 of the control unit 11, thereby to effect energization of the magnet associated with the key 13 in the machine 10d through the resulting translating operation performed within the translating apparatus 12B. Finally, if the operator realizes that an error has been committed in entering a price designation in the machine 10d, the error or correction key 14 of the machine may be operated by actuating and releasing the keys 2, 4 and 8 of the control unit 11 to effect energization of the magnet associated with the key 14 in the machine 10d through the translating operation performed by the apparatus 12B when the identified keys of the control unit 11 are depressed and then released. When any one of the four command keys 11, 12, 13 and 14 is actuated through energization of its associated magnet, a machine operating or clearing cycle is initiated during which the motor shaft and the extension 10e thereof are rotated through one complete revolution. Moreover, during each such revolution the cam switch 10g is opened to deenergize any operated ones of the relays in the translating apparatus 12B and any energized magnet in the keyboard of the machine 10d, so that the translating apparatus 12B and the keyboard of the machine are cleared in readiness to receive additional data under the control of the control unit 11.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In combination with a cash register which comprises a plurality of selectively operable control elements for entering price designations in the register and otherwise controlling the operation of the register, a portable control unit detached from said register and adapted to be carried in one hand by an operator, said control unit comprising a lesser number of selectively operable control keys than there are control elements in said register, control means controlled by selective operation of said control keys for selectively preparing operating circuits for said control elements, and means for completing said prepared operating circuits to actuate said control elements when all of the operated ones of said control keys are released.

2. In combination with a cash register which comprises a plurality of selectively operable electromechanical control elements for entering price designations in the register and otherwise controlling the operation of the register, a portable control unit detached from said register and adapted to be carried in one hand by an operator, said control unit comprising a lesser number of selectively operable control keys than there are control elements in said register, translating apparatus, a plurality of control channels interconnecting the control keys of said control unit with said translating apparatus, said translating apparatus comprising selectively operable means controllable over said control channels by said control keys for selectively energizing said control elements, and means embodied in said translating apparatus and commonly controllable over one of said control channels by the keys of said control unit for preventing said control elements from responding to operation of said control keys until the selected ones of said keys have been operated and then released.

3. In combination with a cash register which comprises a plurality of selectively operable electromechanical elements for selectively entering price designations in the register and otherwise controlling the operation of the register, a portable control unit detached from said register and adapted to be carried in one hand by an operator, said control unit including a lesser number of selectively operable control keys than there are control elements in said register, translating apparatus comprising a plurality of translating relays adapted to be selectively energized in different combinations in response to selective operation of said control keys, circuit means selectively controllable by said translating relays for selectively energizing said control elements to effect control of said register, and means for preventing the control elements of said register from being energized by said circuit means until the selected ones of said control keys have been operated and then released.

4. In combination with a cash register which comprises a plurality of selectively operable electromechanical elements for selectively entering price designations in the register and otherwise controlling the operation of the register, a portable control unit detached from said register and adapted to be carried in one hand by an operator, said control unit including a lesser number of selectively operable control keys than there are control elements in said register, translating apparatus comprising a plurality of translating relays adapted to be selectively energized in different combinations in response to selective operation of any number of said control keys and including more than one of said control keys, circuit means selectively controllable by said translating relays for selectively energizing said control elements to effect control of said register, and means for preventing said translating relays from being energized until the selected ones of said control keys have been operated and then released.

5. In combination with a cash register which comprises a plurality of selectively operable electromechanical elements for selectively entering price designations in the register and otherwise controlling the operation of the register, a portable control unit detached from said register and adapted to be carried in one hand by an operator, said control unit including a lesser number of selectively operable control keys than there are control elements in said register, translating apparatus comprising a plurality of translating relays adapted to be selectively energized in different combinations in response to selective operation of said control keys, a control relay connected to be energized in response to operation of any one of said control keys, and circuit means commonly controlled by said control relay and selectively controllable by said translating relays for selectively energizing said control elements only after the selected control keys have been operated and then released.

6. The combination as claimed in claim 5, wherein said control relay is a fast releasing relay and said translating relays are slow releasing relays, and wherein holding circuits are provided for said translating relays which for the operated ones of said translating relays are completed in response to the release of said control relay upon the release of the operated control keys, and wherein said circuit means is energized to effect energization of one of said control elements in response to the release of said control relay.

7. In combination with a cash register which comprises a plurality of mechanisms for respectively registering the digits of numerical designations having more than one digit in the register and otherwise controlling the operation of the register, a portable control unit detached from said register and adapted to be carried in one hand by an operator, storage means selectively controllable by said control unit separately to store the different digits of a numerical designation to be registered in said register, and translating means controlled by the value of a numerical designation stored in said storage means for controlling said mechanisms to transfer the digits of a numerical designation posted in said storage means to said mechanisms.

8. In combination with a cash register which comprises a plurality of mechanisms for respectively registering the digits of plural digit numerical designations in the register and otherwise controlling the operation of the register, a control unit detached from said register, said control unit comprising a number of selectively operable control keys, storage means selectively controllable to store the different digits of a numerical designation to be registered in said register in response to successive operations of the control keys of said control unit in different combinations, said storage means only being operative to effect a digit storing operation in response to operation and release of one or more of said control keys.

9. In combination with a cash register which comprises a plurality of different order mechanisms for registering the different one to nine and zero digits of plural digit numerical designations in the register and command means for controlling the kind of operation to be performed by the register, a control unit detached from said register and including a plurality of manually actuated means for developing coded signals representative of all digital entries of lower numerical value than ten and more than one digital entry having a numerical value in excess of ten, at least some of said manually actuated means controlling the provision of signals representing digital entries having values that are both less than ten and greater than ten, means controlled by said control unit and responsive to signals developed thereby representative of entries having values of less than ten for imparting corresponding settings to said different order mechanisms, and means controlled by said control unit and responsive to signals developed thereby representative of entries having values in excess of ten for operating said command means.

10. In combination with a cash register which comprises a plurality of different order mechanisms for registering the different one to nine and zero digits of plural digit numerical designations in the register and command means for controlling the kind of operation to be performed by the register, a control unit detached from said register and including a plurality of manually actuated means for developing coded signals representative of entries of lower numerical value than sixteen and more than one entry having a numerical value in excess of fifteen, at least some of said manually actuated means controlling the provision of signals representing entries that are both less in value than sixteen and greater in value than fifteen, means controlled by said control unit and responsive to signals developed thereby representative of entries having values of less than sixteen for imparting corresponding settings to said different order mechanisms, and means controlled by said control unit and responsive to signals developed thereby representative of entries having values in excess of fifteen for operating said command means to select the kind of operation to be performed.

11. In a data handling system, an accounting machine including separate first means for entering digital data into said machine in different denominational orders, separate second means each adapted to store digital data for controlling the operation of one of said first means, data entry means, means for supplying signals to said data entry means representing digital data entrties, and control means included in said data entry means and operative to monitor the values of the entries supplied to said data entry means, said control means being responsive to the values of the entries in a first range of values supplied to said data entry means for transferring the entries in said first range of values to different ones of said second means and being responsive to entries in a second range of values different than said first range of values for initiating operation of said first means under the control of said second means when an entry in said second range of value is supplied to said data entry means.

12. In a data handling system, an accounting machine including a plurality of elements each differentially settable to a position representing an entered digit, a register for controlling each of said elements, signal responsive input means connected to said registers and operable to store successive digital entries having values within a selected one of a first and second range of values, said input means storing entries in said first range of values in different ones of said registers, and means controlled by the storage of an entry in said second range of values in said input means for rendering said registers effective to control the settings of said elements.

13. The data handling system set forth in claim 12 in which said input means includes a key controlled device remote from said accounting machine and adapted to be carried in one hand of an operator, said device including five or less manually operable keys for supplying signals for operating said input means to store digital entries.

14. In combination with a cash register including plural order digit entry means, classification entry means, and total control means; a plurality of digit registers each individual to and connected to the digit entry means in one order; input means operable to store successive digital entries and to transfer entries in a given group of values to different ones of said digit registers; and control means for monitoring the values of the entries stored in said input means, said control means including first means responsive to an entry having a first value for operating said classification entry means and second means responsive to an entry having a second value for operating said total control means, said first and second values being different from said given group of values.

15. In a cash register, control means for operating said register to enter a selected digit in a given denominational order, entry means connected to said control means and including a plurality of selectively operable keys freely movable between operated and released conditions and capable of controlling the entry of the decimal digits "1–9," first means included in said entry means and controlled by the actuation of said keys for selecting a digit to be entered in said control means, and second means in said entry means controlled by the release of said keys for entering said selected digit in said control means.

16. In a cash register including a differentially settable element, control means operable to control the adjustment of the settable element to a desired position, storage means connected to said control means for controlling the operation thereof, a control unit for storing digital data in said storage means, said control unit including a plurality of keys manually operable to released and operated conditions, first circuit means controlled by said keys for conditionally storing digital data in said storage means in response to actuation of one or a combination of said keys, said first circuit means being operable to change the digital data stored in said storage means under the control of said keys for so long as at least one of said keys remains in an operated condition, and second means controlled by said keys and responsive to the release of all of the keys for completing the storage of said digital data in said storage means.

17. In a cash register including a plurality of differentially settable elements, a plurality of control means each individual to one of said settable elements and each operable to control the adjustment of the related one of the settable elements to a desired position, a plurality of storage means each individual to one of said control means, means connecting said storage means in series, a control unit connected to a first one of said series connected in storage means for storing digital data in said storage means, said control unit including a plurality of keys manually operable to released and operated conditions, first circuit means controlled by said keys for conditionally storing digital data in said first storage means in response to actuation of one or a combination of said keys, said first circuit means being operable to change the digital data stored in said first storage means under the control of said keys for so long as at least one of said keys remains in an operated condition, and second means controlled by said keys and responsive to the release of all of the keys for completing the storage of said digital data in said first storage means and for transferring entries from each storage means to the adjacent storage means.

18. In a cash register including a group of first elements differentially settable to positions representing a digital entry and at least one second element differentially settable to different positions representing different operations of the cash register, the combination of a plurality of first digital storage means each adapted to control the setting of one of said first elements, second digital storage means for controlling the setting of the second element, entry means for supplying signals representing digital entries in distinct first and second ranges of values, and value responsive means controlled by said signals from said entry means for directing signals in said first range of values to said first storage means and for the directing signals in said second range of values to said second storage means.

19. The cash register set forth in claim 18 in which said entry means includes a plurality of keys manually operable between released and operated conditions, and in which circuit means are provided for inhibiting operation of said value responsive means until all of the keys are in a released condition.

20. A cash register comprising mechanical means adjustable to ten different settings representing the digits 1–9 and 0, control means for controlling the adjustment of said mechanical means to a desired one of said ten different settings, a plurality of additional control means each operable to cause said cash register to perform a selected type of operation, entry means for supplying signals representing digital entries of values falling within a first range and a second range distinct from said first range, first means supplied with signals from said entry means and controlled by the digit values of the signals received from said entry means for storing a digital entry falling within said first range of said values in said control means, and second means supplied with signals from said entry means and responsive to the digital values of received signals in said second range of values for selecting one of said additional control means for operation so that the cash register performs the desired type of operation represented by the value of the received entry in the second range of values.

21. The cash register set forth in claim 20 in which said entry means includes plurality of manually operable keys and in which at least some of the keys control the provisions of signals in both the first and second ranges of value.

22. In a system for controlling the operation of a cash register from a remote location; a plurality of differentially settable elements in said cash register, a group of said elements being adjustable to different settings in accordance with a decimal digital entry and at least an additional one of said elements being adjustable to different settings in accordance with the type of operation to be performed by said cash register; a plurality of selectively operable detent means in said cash register, each of said detent means associated with one of said differentially settable elements to control the setting thereof; a plurality of digit storing and translating networks, each of said networks being adapted to store a coded digital entry and to translate the coded digital entry into decimal digital form for controlling one of said detent means; a command storage means connected to the detent means for controlling the additional one of the differentially settable elements; a portable control unit remote from said cash register and including a plurality of manually operable keys, said keys being operable to supply a time spaced sequence of coded signals representing decimal digit entries and different types of operations to be performed by said cash register; and a control circuit at said cash register for examining each time spaced signal received from said remote control unit and for storing coded signals representing decimal digit entries in said digit storing and translating networks and for storing coded signals representing different types of cash register operations in said command storage means.

References Cited in the file of this patent

UNITED STATES PATENTS

| | | | |
|---|---|---|---|
| 988,327 | Foster | Apr. 4, | 1911 |
| 1,903,337 | Hage | Apr. 4, | 1933 |
| 2,261,115 | Hofgaard | Nov. 4, | 1941 |
| 2,325,960 | Lake | Aug. 3, | 1943 |
| 2,375,332 | Torkelson | May 8, | 1945 |
| 2,407,411 | Folis | Sept. 10, | 1946 |
| 2,552,789 | Hopkins | May 15, | 1951 |
| 2,741,427 | Drake | Apr. 10, | 1956 |
| 2,745,093 | Holman et al. | May 8, | 1956 |
| 2,767,907 | Schwend | Oct. 23, | 1956 |
| 2,800,277 | Williams et al. | July 23, | 1957 |